US012668501B2

(12) United States Patent
Watanabe et al.

(10) Patent No.: US 12,668,501 B2
(45) Date of Patent: Jun. 30, 2026

(54) METAL OXIDE PARTICLE HAVING CORE-SHELL STRUCTURE AND METHOD FOR PRODUCING SAME

(71) Applicant: NISSAN CHEMICAL CORPORATION, Tokyo (JP)

(72) Inventors: Yuki Watanabe, Funabashi (JP); Masato Yamaguchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/996,776

(22) PCT Filed: Apr. 17, 2024

(86) PCT No.: PCT/JP2024/015238
§ 371 (c)(1),
(2) Date: Jan. 17, 2025

(87) PCT Pub. No.: WO2024/236995
PCT Pub. Date: Nov. 21, 2024

(65) Prior Publication Data
US 2025/0256980 A1 Aug. 14, 2025

(30) Foreign Application Priority Data
May 16, 2023 (JP) ................................ 2023-081102

(51) Int. Cl.
*C01G 23/047* (2006.01)
*B01J 13/00* (2006.01)
*C09D 7/62* (2018.01)

(52) U.S. Cl.
CPC ........ *C01G 23/047* (2013.01); *B01J 13/0047* (2013.01); *C09D 7/62* (2018.01);
(Continued)

(58) Field of Classification Search
CPC ....... C01G 23/047; C09D 7/62; B01J 13/0047
See application file for complete search history.

(56) References Cited

U.S. PATENT DOCUMENTS 4,211,823 A 7/1980 Suzuki et al.
4,306,780 A 12/1981 Tarumi et al.
(Continued)

FOREIGN PATENT DOCUMENTS

CN 101815675 A 8/2010
CN 102433041 A 5/2012
(Continued)

OTHER PUBLICATIONS

May 25, 2025 Office Action issued in Chinese Patent Application No. 202480002786.2.
(Continued)

*Primary Examiner* — James A Fiorito
(74) *Attorney, Agent, or Firm* — Oliff PLC

(57) ABSTRACT

Core-shell type metal oxide particles each include: a core containing metal oxide particles that have an average primary particle diameter of 3-100 nm; and a shell containing metal oxide particles that have an average primary particle diameter of 1-7 nm and that cover the core surfaces. The average primary particle diameters have a relationship of (metal oxide particles of the cores)>(metal oxide particles of the shells). When component (a) is titanium oxide and component (b) is a metal oxide other than titanium oxide, the cores are formed of particles including component (a) or a combination of component (a) and component (b), and the shells are formed of particles including component (b). The mass ratio of (metal oxide other than titanium oxide)/(titanium oxide) is in the range of 0.05-1.0.

16 Claims, 1 Drawing Sheet

(52) U.S. Cl.
CPC ...... *C01P 2002/86* (2013.01); *C01P 2004/64* (2013.01); *C01P 2004/86* (2013.01); *C01P 2006/22* (2013.01)

(56) References Cited

U.S. PATENT DOCUMENTS

| | | | | |
|---|---|---|---|---|
| 2017/0073237 | A1* | 3/2017 | Lim | C09D 7/70 |
| 2019/0144707 | A1 | 5/2019 | Kato et al. | |
| 2019/0185678 | A1 | 6/2019 | Murakami et al. | |
| 2020/0087162 | A1 | 3/2020 | Yamaguchi et al. | |
| 2021/0163756 | A1 | 6/2021 | Furukawa et al. | |
| 2021/0223686 | A1 | 7/2021 | Joshi et al. | |

FOREIGN PATENT DOCUMENTS

| | | | |
|---|---|---|---|
| CN | 103571255 | A | 2/2014 |
| EP | 3 438 053 | A1 | 2/2019 |
| EP | 3 725 855 | A1 | 10/2020 |
| JP | S52-016586 | A | 2/1977 |
| JP | S53-111336 | A | 9/1978 |
| JP | S55-013747 | A | 1/1980 |
| JP | S62-151801 | A | 7/1987 |
| JP | S63-275682 | A | 11/1988 |
| JP | S64-054021 | A | 3/1989 |
| JP | H10-306258 | A | 11/1998 |
| JP | 2001-23115 | A | 1/2001 |
| JP | 2003-034278 | A | 2/2003 |
| JP | 2015-143297 | A | 8/2015 |
| JP | 2023-511307 | A | 3/2023 |
| WO | 2012/165620 | A1 | 12/2012 |
| WO | 2017/170275 | A1 | 10/2017 |
| WO | 2017/170385 | A1 | 10/2017 |
| WO | 2018/181241 | A1 | 10/2018 |
| WO | 2019/117086 | A1 | 6/2019 |
| WO | 2021/216181 | A1 | 10/2021 |
| WO | 2021-216193 | A1 | 10/2021 |
| WO | 2023/068207 | A1 | 4/2023 |

OTHER PUBLICATIONS

Jul. 30, 2025 Search Report issued in European Patent Application No. 24806949.4.

Jun. 25, 2024 International Search Report issued in International Patent Application No. PCT/JP2024/015238.

Jun. 25, 2024 Written Opinion issued in International Patent Application No. PCT/JP2024/015238.

* cited by examiner

[Fig. 1]
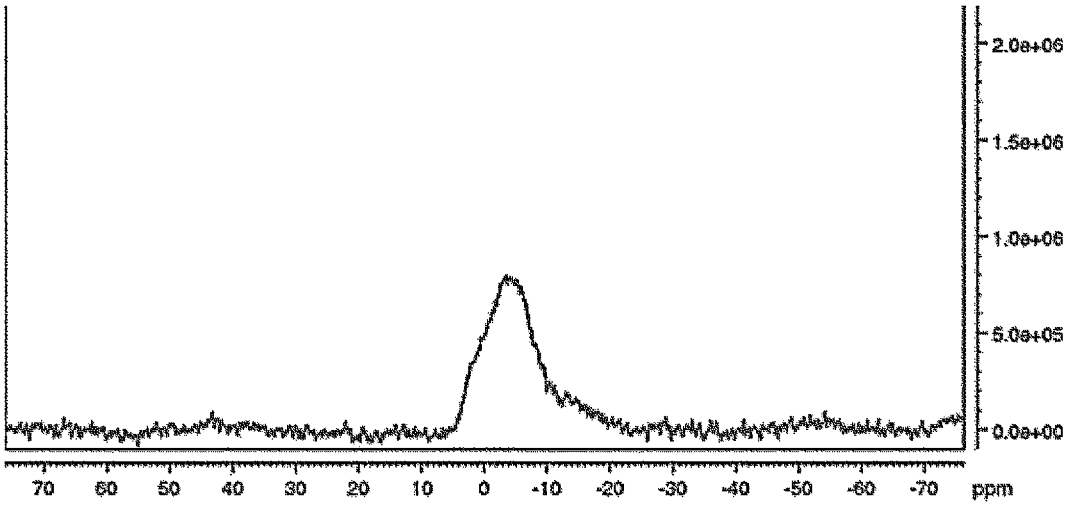
[Fig. 2]
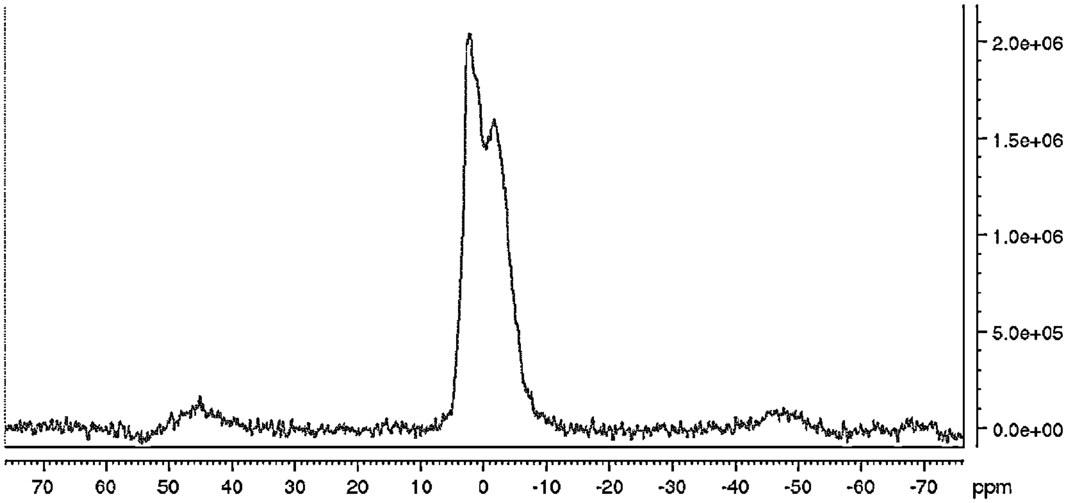
[Fig. 3]
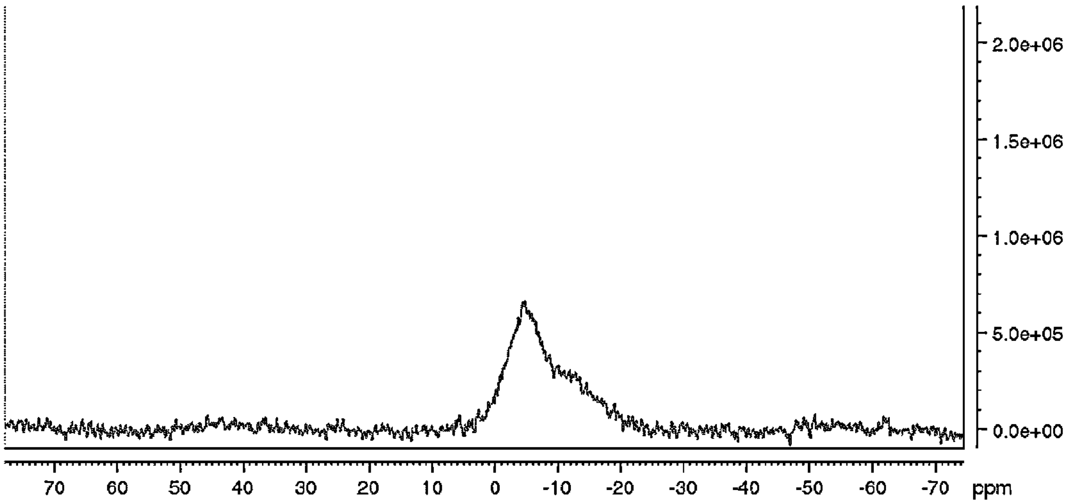

METAL OXIDE PARTICLE HAVING CORE-SHELL STRUCTURE AND METHOD FOR PRODUCING SAME

TECHNICAL FIELD

The present invention relates to a modified metal oxide particle comprising a titanium dioxide-containing metal oxide particle as a core coated with metal oxide particles other than titanium oxide, and a method for producing the modified particle.

BACKGROUND ART

Plastic moldings are used in large quantities because of their advantages such as light weight, ease of processing, and impact resistance. On the other hand, for example, they are easily scratched due to insufficient hardness, are easily damaged by solvents, absorb dust by their electrostatic charge, and have insufficient heat resistance. Thus, there was a practical disadvantage in using them as eyeglass lenses, window materials, and so on. Here, it has been proposed to apply a protective film onto plastic moldings. Many types of film formation-use coating liquids have indeed been proposed that can be used for protective films.

A film formation-use coating liquid that uses an organic silicon compound or its hydrolysate as the main component (resin component or coating film forming component) is used for eyeglass lenses to provide a hard film similar to an inorganic film (see Patent Document 1).

Scratch resistance, however, is still unsatisfactory for the above film formation-use coating liquid. Thus, it has been proposed that a colloidally dispersed silica sol is further added to this coating liquid. The resulting coating liquid is then put into practice and is used for eyeglass lenses (see Patent Document 2).

By the way, plastic eyeglass lenses have conventionally been manufactured mostly by cast polymerization of diethylene glycol bis-allyl carbonate monomer. This lens has a refractive index of approximately 1.50, which is lower than the refractive index of glass lenses, which refractive index is approximately 1.52. This lens has the disadvantage of having a thicker edge in the case of a lens for myopia. Therefore, in recent years, monomers with a higher refractive index than diethylene glycol bis-aryl carbonate have been developed, and resin materials with a high refractive index in the range of 1.54 to 1.76 have been disclosed (see Patent Documents 3 and 4).

For such high-refractive-index resin lenses, a method using colloidal dispersions of Sb and/or Ti metal oxide particles as coating materials has also been disclosed (see Patent Documents 5 and 6).

Also disclosed is a coating composition comprising a silane coupling agent and particles (c) comprising a metal oxide colloidal particle (a) having a primary particle diameter of 2 to 60 nm as a core, a surface of which is coated by a coating material (b) composed of acid oxide colloidal particles, wherein the content ratio of particles (c) is from 2 to 50 mass % in terms of metal oxide, and this coating composition comprises a stable modified metal oxide sol having a primary particle diameter of 2 to 100 nm. Specific examples of the colloidal particles used and disclosed include modified titanium dioxide-zirconium oxide-tin dioxide composite colloids coated with alkylamine-containing antimony pentoxide (see Patent Document 7). Also disclosed are titanium dioxide-tin dioxide-zirconium oxide composite colloids stabilized with an alkylamine and oxycarboxylic acid, and the like (see Patent Document 8).

PRIOR ART DOCUMENTS

Patent Document

Patent Document 1: JP S52-16586 A
Patent Document 2: JP S53-111336 A
Patent Document 3: JP S55-13747 A
Patent Document 4: JP S64-54021 A
Patent Document 5: JP S62-151801A
Patent Document 6: JP S63-275682 A
Patent Document 7: JP 2001-123115 A
Patent Document 8: JP H10-306258 A

SUMMARY OF INVENTION

Technical Problem

The present invention provides: a modified metal oxide particle, namely a core-shell type metal oxide particle used in a composition for obtaining a coating material with a high refractive index and high moldability (e.g., for nanoimprinting), the modified metal oxide particle comprising a titanium dioxide-containing metal oxide particle as a core and metal oxide particles other than titanium oxide as a shell that covers the core where a part of the core is exposed; and a method for producing the modified metal oxide particle.

Solution to Problem

The first item of the present invention provides a core-shell type metal oxide particle comprising: a core comprising a metal oxide particle having an average primary particle diameter of 3 to 100 nm; and a shell comprising metal oxide particles having an average primary particle diameter of 1 to 7 nm and covering a surface of the core, wherein the average primary particle diameter has a relationship: (the metal oxide particle in the core)> (the metal oxide particles in the shell), wherein when a component (a) is titanium dioxide and a component (b) is a metal oxide other than titanium oxide, the core comprises a particle comprising the component (a) or a combination of the components (a) and (b) and the shell comprises a particle comprising the component (b), and the following requirements A and B are satisfied:

the requirement A: in a test of bringing the core-shell type metal oxide particle into contact with a compound having a P—OH bond, the core-shell type metal oxide particle is found, by NMR, to have a P—O—Ti bond formed, and the requirement B: the core-shell type metal oxide particle has a refractive index of 1.85 or more.

The second item provides the core-shell type metal oxide particle according to item 1, wherein the respective component (b) is a particle of at least one metal oxide selected from the group consisting of zirconium oxide, silicon dioxide, aluminum oxide, tin oxide, zinc oxide, iron oxide, niobium oxide, tantalum oxide, antimony oxide, and tungsten oxide.

The third item provides the core-shell type metal oxide particle according to item 1 or 2, wherein a mass ratio of (metal oxide other than titanium oxide)/(titanium dioxide) ranges from 0.05 to 1.0.

The fourth item provides the core-shell type metal oxide particle according to any one of items 1 to 3, wherein an intermediate layer is present between the core particle and the shell particles, and the intermediate layer comprises, as a component (D), a metal oxide particle comprising a combination of at least one selected from the group consisting of zirconium oxide, silicon dioxide, aluminum oxide, tin oxide, zinc oxide, iron oxide, niobium oxide, tantalum oxide, antimony oxide, and tungsten oxide, and wherein a mass ratio of (metal oxide other than titanium oxide)/(titanium dioxide) ranges from 0.05 to 1.0.

The fifth item provides the core-shell type metal oxide particle according to any one of items 1 to 4, wherein the core-shell type metal oxide particle has a surface coated with a compound having a P—OH bond or an Si—OH bond.

The sixth item provides the core-shell type metal oxide particle according to any one of items 1 to 5, wherein the compound having an Si—OH bond is at least one silane compound or a hydrolysate thereof, the at least one silane compound being selected from the group consisting of formulas (1) to (3):

[Chemical Formula 1]

$R^1_aSi(R^2)_{4-a}$ Formula (1)

$[R^3_bSi(R^4)_{3-b}]_2Y_c$ Formula (2)

$R^5_dSi(R^6)_{4-d}$ Formula (3)

wherein in formula (1), $R^1$ moieties are each an alkyl group, a halogenated alkyl group, an alkenyl group, an aryl group, or an organic group having a polyether group, an epoxy group, a (meth)acryloyl group, a mercapto group, an amino group, a ureido group, or a cyano group, and bonded to a silicon atom via an Si—C bond, $R^2$ moieties each represent an alkoxy group, an acyloxy group, or a halogen group, and a represents an integer from 1 to 3; and In formulas (2) and (3), $R^3$ and $R^5$ moieties are each a $C_{1-3}$ alkyl group or a $C_{6-30}$ aryl group, and bonded to a silicon atom via an Si—C bond, $R^2$ and $R^6$ moieties are each an alkoxy group, an acyloxy group, or a halogen group, Y is an alkylene group, an NH group, or an oxygen atom, b is an integer from 1 to 3, c is an integer 0 or 1, and d is an integer from 1 to 3.

The seventh item provides the core-shell type metal oxide particle according to any one of items 1 to 5, wherein the compound having a P—OH bond is at least one phosphoric acid ester selected from the group consisting of formulas (4) to (6):

[Chemical Formula 2]

Formula (4)

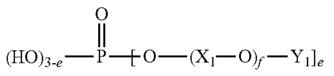

Formula (5)

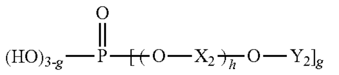

Formula (6)

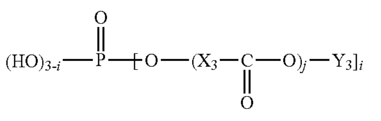

wherein $X_1$, $X_2$, and $X_3$ each represent a $C_{2-20}$ alkylene group, f, h, and j each represent an integer from 1 to 100, e, g, and i each represent an integer from 1 to 3, and $Y_1$, $Y_2$, and $Y_3$ each represent a hydrogen atom, a $C_{1-20}$ alkyl group, a $C_{2-20}$ alkenyl group, a $C_{6-30}$ aryl group, or a (meth)acrylic group.

The eighth item provides the core-shell type metal oxide particle according to item 7, wherein the phosphoric acid ester is a polyoxyethylene alkyl ($C_{6-20}$) ether phosphoric acid ester having a $C_{6-20}$ alkyl group.

The ninth item provides a core-shell type metal oxide sol comprising, as a dispersing matter, the core-shell type metal oxide particle according to any one of items 1 to 8 as dispersed in a dispersing medium comprising an alcohol optionally having an ether bond, an ester, a ketone, an amide, a hydrocarbon, a silicone, a compound containing an unsaturated bond between chain carbon atoms, an oxirane compound, water, or any combination thereof, wherein an average particle diameter thereof is from 5 to 500 nm as measured by a dynamic light scattering method.

The tenth item provides the core-shell type metal oxide sol according to item 9, further comprising a surfactant, wherein the surfactant is an anionic surfactant, a cationic surfactant, a nonionic surfactant, or an amphoteric surfactant.

The eleventh item provides the core-shell type metal oxide sol according to item 9 or 10, further comprising a secondary or tertiary amine having a total carbon atom number of 5 to 35.

The twelfth item provides a varnish comprising the core-shell type metal oxide particle according to any one of items 1 to 8 and a thermosetting or photocurable resin.

The thirteenth item provides the varnish according to item 12, wherein the varnish is a hard coating agent or a composition for nanoimprinting.

The fourteenth item provides a method for producing the core-shell type metal oxide sol according to any one of items 9 to 11, the method comprising the steps (i) and (ii):

step (i): step (i) of preparing a sol (A) comprising, as a dispersing medium, water comprising a metal oxide particle having an average primary particle diameter of 3 to 60 nm as measured by a nitrogen gas adsorption method and a sol (B) comprising, as a dispersing medium, water comprising a metal oxide particle having an average primary particle diameter of 1 to 7 nm as measured by a nitrogen gas adsorption method; and step (ii): step (ii) of mixing the sol (A) and the sol (B) such that a solid content of one of the sols is admixed in a container at a rate of 22 to 1000 parts by mass per minute based on 100 parts by mass of a solid content of the other sol packed in the container.

The fifteenth item provides the method for producing a core-shell type metal oxide sol according to item 14, wherein step (i) or (ii) further comprising step (S-1): a step of adding, to the aqueous sol, a secondary or tertiary amine having a total carbon atom number of 5 to 35.

The sixteenth item provides the method for producing a core-shell type metal oxide sol according to item 14 or 15, further comprising, after step (ii), at least one step selected from the group consisting of steps (T-1), (T-2), and (T-3):

step (T-1): a step of adding at least one silane compound selected from the group consisting of formulas (1) to (3) or at least one phosphoric acid ester selected from the group consisting of formulas (4) to (6) to the core-shell type metal oxide sol obtained in step (ii);

step (T-2): a step of solvent-replacing the dispersing medium for the core-shell type metal oxide sol obtained in step (ii) with a dispersing medium comprising an alcohol, an ester, a ketone, an amide, or a hydrocarbon;

and step (T-3): a step of adding a surfactant to the core-shell type metal oxide sol obtained in step (ii).

The seventeenth item provides the method for producing a core-shell type metal oxide sol according to any one of items 14 to 16, wherein the steps are implemented in an order of step (i), step (S-1), step (ii), step (S-1), step (T-2), step (T-1), and step (T-2).

Advantageous Effects of Invention

The present invention provides a modified metal oxide particle comprising a titanium dioxide-containing metal oxide particle as a core coated with metal oxide particles other than titanium oxide as a shell.

Titanium dioxide has a high refractive index and is used for highly refractive materials. On the other hand, titanium dioxide particles are highly photoactive, and when mixed with various binders or resin components as matrix components, discoloration or degradation of the matrix components may occur.

In order to suppress photoactivity, a core-shell type modified metal oxide particle has been proposed, in which a titanium dioxide particle(s) is coated with metal oxide particles other than titanium oxide. In the core-shell type metal oxide particle, the core titanium dioxide particle(s) or titanium dioxide-containing metal oxide particle(s) may be coated with metal oxide particles other than titanium oxide as the shell. In this case, if the core is completely coated, the percentage of the titanium dioxide component decreases. As a result, the refractive index of the core-shell type metal oxide particle may not be improved.

In order to maintain a high refractive index in the core-shell type metal oxide particle, the present invention provides a core-shell type modified metal oxide particle such that the core particle(s) is not completely covered with shell particles, but a part of the core particle surface is exposed. The fact that a part of the core is exposed can be checked by a test in which the core-shell type metal oxide particle is brought into contact with a compound having a P—OH bond. When the formation of a P—O—Ti bond in the core-shell type metal oxide particle is observed in a $^{31}$P-NMR spectrum, it is determined that the P—O—Ti "bond is present". This can verify that in the core-shell type metal oxide particle, a part of the core is exposed.

In the core-shell type metal oxide particle of the present invention, the core-shell type metal oxide particle has a part of the core particle surface exposed. A particle A with a partially exposed part of the core particle surface, and a similar particle B are provided such that an exposed part of the core particle and a part of the shell particle interact. When the particle is coated on a base material or the irregularities of the base material surface, the coating material and filling material are integrated therewith and function as a mass. For example, a coating material on a substrate is designed to improve weather resistance.

In addition, a core particle with a higher refractive index than that of shell particles and the shell particles with a lower refractive index than that of the core particle may be combined to give a highly refractive material. In this case, no excess shell particles are present in a sol containing the core-shell metal oxide particle with a partially exposed core particle surface. Therefore, when the sol is used for a coating material or a filling material, the decrease in refractive index of the coating material or filling material after curing can be suppressed. In the present invention, the refractive index of the core-shell type metal oxide particle is 1.85 or higher, and may range, for example, from 1.85 to 2.30.

BRIEF DESCRIPTION OF DRAWINGS

FIG. 1 is a $^{31}$P-NMR spectrum in which the presence or absence of a P—O—Ti bond is checked by $^{31}$P-NMR in a core-shell type metal oxide particle in the methanol solvent-dispersed sol used in Example 1.

FIG. 2 is a $^{31}$P-NMR spectrum in which the presence or absence of a P—O—Ti bond is checked by $^{31}$P-NMR in a core metal oxide particle alone in the methanol solvent-dispersed sol used in Comparative Example 1.

FIG. 3 is a $^{31}$P-NMR spectrum in which the presence or absence of a P—O—Ti bond is checked by $^{31}$P-NMR in a core-shell type metal oxide particle in the methanol solvent-dispersed sol used in Comparative Example 3.

DESCRIPTION OF EMBODIMENTS

The present invention provides a core-shell type metal oxide particle comprising: a core comprising a metal oxide particle having an average primary particle diameter of 3 to 60 nm; and a shell comprising metal oxide particles having an average primary particle diameter of 1 to 7 nm and covering a surface of the core, wherein the average primary particle diameter has a relationship: (the metal oxide particle in the core)>(the metal oxide particles in the shell), wherein when a component (a) is titanium dioxide and a component (b) is a metal oxide other than titanium oxide, the core comprises a particle comprising the component (a) or a combination of the components (a) and (b) and the shell comprises a particle comprising the component (b), and the following requirements A and B are satisfied:

the requirement A: in a test of bringing the core-shell type metal oxide particle into contact with a compound having a P—OH bond, the core-shell type metal oxide particle is found, by NMR, to have a P—O—Ti bond formed, and the requirement B: the core-shell type metal oxide particle has a refractive index of 1.85 or more.

The present invention can provide a core-shell type metal oxide particle such that the refractive index of the core-shell type metal oxide particle is 1.85 or more, and may range, for example, from 1.85 to 2.30.

The component (a) is titanium dioxide and the respective component (b) that can be used is a particle made of at least one metal oxide selected from the group consisting of zirconium oxide, silicon dioxide, aluminum oxide, tin oxide, zinc oxide, iron oxide, niobium oxide, tantalum oxide, antimony oxide, and tungsten oxide.

The core particle is preferably a particle consisting of (a) component, or a combination of (a) and (b) components. Examples include a titanium dioxide particle(s), a composite particle(s) of titanium dioxide and tin oxide particles, a composite particle(s) of titanium dioxide and zirconium oxide particles, or a composite particle(s) of titanium dioxide, tin oxide, and zirconium oxide particles.

It is preferred that the shell particles are particles consisting of the component (b). The shell particles can be particles made of at least one metal oxide selected from the group consisting of zirconium oxide, silicon dioxide, aluminum oxide, tin oxide, zinc oxide, iron oxide, niobium oxide, tantalum oxide, antimony oxide, and tungsten oxide.

The core-shell type metal oxide particle is composed of a combination of a core particle(s) and shell particles, and examples include a core particle/shell particle combination of titanium dioxide particle/tin oxide and silicon dioxide composite particle, titanium dioxide and tin oxide composite particle/tin oxide and silicon dioxide composite particle, titanium dioxide and zirconium oxide composite particle/tin oxide and silicon dioxide composite particle, titanium dioxide, tin oxide, and zirconium oxide composite particle/tin oxide and silicon dioxide composite particle, titanium dioxide particle/antimony oxide particle, or titanium dioxide and tin oxide composite particle/antimony oxide particle.

The mass ratio of (metal oxide other than titanium oxide)/(titanium dioxide) in the core-shell type metal oxide particle ranges from 0.05 to 1.0, 0.1 to 1.0, or 0.15 to 1.0.

In the present invention, an intermediate layer may be present between the core particle(s) and shell particles. The intermediate layer is metal oxide particles composed of a combination of at least one selected from the group consisting of zirconium oxide, silicon dioxide, aluminum oxide, tin oxide, zinc oxide, iron oxide, niobium oxide, tantalum oxide, antimony oxide, and tungsten oxide. The mass ratio of (metal oxide other than titanium oxide)/(titanium dioxide) can be set to the range of from 0.05 to 1.0, 0.1 to 1.0, or 0.15 to 1.0.

In the core-shell type metal oxide particle or the metal oxide particle with an intermediate layer between the core particle(s) and shell particles, the metal oxide particle is found, by $^{31}P$ NMR spectrum, to have a P—O—Ti bond formed in a test of bringing the metal oxide particle into contact with a compound having a P—OH bond. This can be judged such that a P—O—Ti "bond is present" between the core particle and the compound having a P—OH bond. This can verify that in the core-shell type metal oxide particle, a part of the core is exposed. The core-shell type metal oxide particle or the metal oxide particle with an intermediate layer between the core particle(s) and shell particles has been demonstrated to have a part of the core particle exposed in the particle.

Examples of the metal oxide particle used in the core can include titanium dioxide, titanium dioxide-tin oxide composite oxide, titanium dioxide-zirconium oxide composite oxide, or titanium dioxide-zirconium oxide-tin oxide composite oxide. They have an average primary particle diameter of 5 to 500 nm, 5 to 300 nm, 5 to 250 nm, or 5 to 60 nm, and preferably 3 to 100 nm, 3 to 80 nm, 3 to 60 nm, 3 to 40 nm, 3 to 20 nm, or 5 to 40 nm as measured by transmission electron microscopy.

The coating-use metal oxide particle may be, for example, a particle made of at least one metal oxide selected from the group consisting of zirconium oxide, silicon dioxide, aluminum oxide, tin oxide, zinc oxide, iron oxide, niobium oxide, tantalum oxide, antimony oxide, and tungsten oxide. They have an average primary particle diameter of 1 to 10 nm, 1 to 7 nm, or 1 to 5 nm as measured by transmission electron microscopy.

Examples include a metal oxide particle in which silicon dioxide, tin oxide, antimony oxide, tungsten oxide, aluminum oxide, and zirconium oxide are each present alone, or a composite metal oxide particle in which multiple metal oxides above are combined. Examples of the composite metal oxide particle include a tin oxide-silicon dioxide composite metal oxide particle, a tin oxide-zirconium oxide-silicon dioxide composite metal oxide particle, a tin oxide-tungsten oxide-silicon dioxide composite metal oxide particle, or an antimony oxide-silicon dioxide composite metal oxide particle. When the coating-use metal oxide particles contain silicon dioxide, the ratio of silicon dioxide to other metal oxides, namely the mass ratio of (silicon dioxide)/(other metal oxides) can be set to the ratio from 0.1 to 5.0.

When a core-shell structure is used, the core may be coated with the metal oxide particles made of a metal oxide having a different metal oxide component or a different metal oxide content from that of the core. This means to include a case in which the metal oxide components are different between the core and the shell or a case in which the metal oxide components may be partly the same but the metal oxide blending ratio is different.

In the case of the core-shell structure, the mass ratio of the core metal oxide particle(s) to the shell metal oxide particles can be set to be in the range of (shell metal oxide particles)/(core metal oxide particle(s))=0.05 to 0.40.

For example, a shell-use tin oxide-silicon dioxide composite oxide may be exemplified. Sodium stannate or potassium stannate may be used as an alkali stannate. Preferred is sodium stannate.

Sodium silicate or potassium silicate may be used as alkali silicate.

Alkali stannate and alkali silicate are prepared as an aqueous solution containing silicon dioxide/tin dioxide at a mass ratio of 0.1 to 5, and the cations present in the aqueous solution can then be removed by using a cation exchange resin.

Alkali stannate and alkali silicate are prepared by weighing and dissolving, in water, silicon dioxide/tin dioxide at a mass ratio of 0.1 to 5.0. The preferred solid content of the aqueous solution is from 1 to 12 mass % as ($SnO_2$+$SiO_2$).

The prepared aqueous solution is cation-exchanged with a cation exchange resin to remove cations. As the cation exchange resin, a hydrogen-type strongly acidic cation exchange resin is preferred, such as AMBERLITE (trade name) 120B, which can be packed in a column. This cation exchange allows the silicate and stannate components to polymerize to form silicon dioxide-tin dioxide composite colloidal particles with an average primary particle diameter of 1 to 4 nm.

The silicon dioxide-tin dioxide composite colloidal particles are poorly stable, and gelatinize in a few hours when left as they are. Therefore, after cation exchange, an amine compound should be added immediately to stabilize the aqueous sol of silicon dioxide-tin dioxide composite oxide colloidal particles having an average primary particle diameter of 1 to 4 nm as stabilized with an amine compound present at a silicon dioxide/tin dioxide mass ratio of 0.1 to 5.0 and an M/($SnO_2$+$SiO_2$) (where M represents the amine compound) molar ratio of 0.1 to 1.0. The resulting aqueous sol is from 0.1 to 10 mass % as ($SnO_2$+$SiO_2$).

For stabilization of the silicon dioxide-tin dioxide composite colloidal particles produced by the above-mentioned cation exchange, an amine compound in an amount of 0.1 to 1.0 as the molar ratio of M/($SnO_2$+$SiO_2$) (where M represents the amine compound) is suitably added. If an amine compound is added at a molar ratio of M/($SnO_2$+$SiO_2$) of less than 0.1 to 1.0, they lose stability and are gelatinized after several hours of standing. This is not preferable.

Next, an aqueous sol of metal oxide colloidal particles (a) is prepared for the core having an average primary particle diameter of 5 to 60 nm. Then, prepared is an aqueous sol of silicon dioxide-tin dioxide composite oxide colloidal particles (b) having an average primary particle diameter of 1 to 4 nm as stabilized with an amine compound present at a silicon dioxide/tin dioxide mass ratio of 0.1 to 5.0 and an M/($SnO_2$+$SiO_2$) (where M represents the amine compound) molar ratio of 0.1 to 1.0. The silicon dioxide-tin dioxide composite oxide colloidal particles and the former metal oxide colloidal particles are mixed at a mass ratio (b)/(a) of 0.05 to 0.40. This can produce an aqueous sol of modified metal oxide colloidal particles, in which the former metal oxide colloidal particle(s) (a) is coated by the silicon dioxide-tin dioxide composite oxide colloidal particles (b).

The solid content of the aqueous sol of the metal oxide colloidal particles (a) is from 0.5 to 50 mass % and preferably from 5 to 30 mass %.

The aqueous sol of the metal oxide colloidal particles (a) can be used at pH 5 to 11.5 and preferably pH 7 to 11.5. The pH of the aqueous sol can be adjusted by an alkaline component if necessary. Examples of the alkali component used include: an alkali metal (e.g., lithium, sodium, and potassium) hydroxide; an alkaline earth metal (e.g., calcium, magnesium, strontium) hydroxide; an alkylamine (e.g., ammonia, ethylamine, triethylamine, isopropylamine, n-propylamine); an aralkylamine (e.g., benzylamine); an alicyclic amine (e.g., piperidine); an alkanolamine (e.g., monoethanolamine, triethanolamine); or a quaternary ammonium hydroxide.

The aqueous sol of the metal oxide colloidal particles (a) and the aqueous sol of the shell particles (b) are preferably mixed under stirring.

The blending ratio of the silicon dioxide-tin dioxide composite oxide colloidal particles (b) to the metal oxide colloidal particles (a), namely a mass ratio (b)/(a), is preferably from 0.05 to 0.40. When the ratio is less than 0.05, the metal oxide colloidal particle(s), which is a core, may not be sufficiently coated by the silicon dioxide-tin dioxide composite oxide colloidal particles (b). This results in difficulty to achieve a stable hydrophilic organic solvent-dispersed sol or a hydrophobic organic solvent-dispersed sol with a water solubility of 0.05 to 12 mass %. In addition, a mass ratio of 0.40 or more is sufficient and may result in complete coverage.

The resulting aqueous sol of modified metal oxide colloidal particles is then cation-exchanged. A hydrogen-type strongly acidic cation exchange resin is preferably used for the cation exchange.

Next, the resulting aqueous sol is added an amine compound at a ratio of $M/(SnO_2+SiO_2)$ (where M represents the amine compound) of 0.001 to 0.08 as a molar ratio of the amine compound to the silicon dioxide-tin dioxide composite colloidal particles (b). If the amount of amine compound added is less than 0.001 as the molar ratio of $M/(SnO_2+SiO_2)$, the dispersion stability of the hydrophilic organic solvent-dispersed sol of the present invention becomes insufficient. This is not preferable. In addition, the molar ratio of $M/(SnO_2+SiO_2)$ may exceed 0.08. In the case of a silane compound to be bonded to the particle surface of the modified metal oxide colloidal particles, the bonding may be hindered.

The metal oxide particle(s) of the present invention can be obtained through the metal oxide sols.

The metal oxide sols can be obtained by the following method.

For example, the method for producing a core-shell type metal oxide sol includes the following steps (i) and (ii):

- step (i): step (i) of preparing a sol (A) comprising, as a dispersing medium, water comprising a metal oxide particle having an average primary particle diameter of 3 to 60 nm as measured by a nitrogen gas adsorption method and a sol (B) comprising, as a dispersing medium, water comprising a metal oxide particle having an average primary particle diameter of 1 to 7 nm as measured by a nitrogen gas adsorption method; and
- step (ii): step (ii) of mixing the sol (A) and the sol (B) such that a solid content of one of the sols is admixed in a container at a rate of 22 to 1000 parts by mass, 22 to 500 parts by mass, or 22 to 100 parts by mass per minute based on 100 parts by mass of the solid content of the other sol packed in the container.

The sol (A) is an aqueous sol containing the above core particle(s), and the sol (B) is an aqueous sol containing the above shell particles.

Step (i) or (ii) of the present invention may further include step (S-1): a step of adding, to the aqueous sol, a secondary or tertiary amine having a total carbon atom number of 5 to 35.

In addition, the present invention may further include, after step (ii), at least one additional step selected from (T-1), (T-2), and (T-3) steps.

Step (T-1) is a step of adding at least one silane compound selected from the group consisting of formulas (1) to (3) or at least one phosphoric acid ester selected from the group consisting of formulas (4) to (6) to the core-shell type metal oxide sol obtained in step (ii).

Step (T-2) is a step of solvent-replacing the dispersing medium for the core-shell type metal oxide sol obtained in step (ii) with a dispersing medium comprising an alcohol, an ester, a ketone, an amide, or a hydrocarbon.

Step (T-3) is a step of adding a surfactant to the core-shell type metal oxide sol obtained in step (ii).

In the present invention, the steps may include, in sequence, step (i), step (S-1), step (ii), step (S-1), step (T-2), step (T-1), and step (T-2).

In addition, step (T-3) may be added to any step.

In the present invention, a secondary or tertiary amine with a total carbon atom number of 5 to 35 may be included.

The content of the above amine based on 100 g of $SiO_2$ in the silica particles may be set to 0.01 to 10.0 mmol or 0.01 to 5.0 mmol.

Examples of the above secondary amine include ethyl n-propylamine, ethyl isopropylamine, dipropylamine, diisopropylamine, ethyl butylamine, n-propyl butylamine, dibutylamine, ethyl pentylamine, n-propyl pentylamine, isopropyl pentylamine, dipentylamine, ethyl octylamine, i-propyl octylamine, butyl octylamine, or dioctylamine.

Examples of the above tertiary amine include triethylamine, ethyl di-n-propylamine, diethyl-n-propylamine, tri-n-propylamine, triisopropylamine, ethyl dibutylamine, diethyl butylamine, isopropyl dibutylamine, diisopropylethylamine, diisopropylbutylamine, tributylamine, ethyl dipentylamine, diethyl pentylamine, tripentylamine, methyl dioctylamine, dimethyl octylamine, ethyl dioctylamine, diethyl octylamine, trioctylamine, benzyl dibutylamine, or diazabicycloundecene.

Among the above amines, a secondary or tertiary amine having an alkyl group with a total carbon atom number of 6 to 35 is preferable. Examples include diisopropylamine, tripentylamine, triisopropylamine, dimethyloctylamine, or trioctylamine.

In the present invention, the silane compound is a silane coupling agent. The silane coupling agent, in the present invention, allows the photoactive metal oxide particle(s) (A) to be coated with at least one silane compound hydrolysate selected from the group consisting of formulas (1) to (3).

The resulting hydrophilic organic solvent-dispersed sol can be coated with at least one silane compound hydrolysate selected from the group consisting of formulas (1) to (3).

In formula (1), $R^1$ moieties are each an alkyl group, a halogenated alkyl group, an alkenyl group, an aryl group, or an organic group having a polyether group, an epoxy group, a (meth)acryloyl group, a mercapto group, an amino group, a ureido group, or a cyano group, and bonded to a silicon atom via an Si—C bond, $R^2$ moieties each represent an alkoxy group, an acyloxy group, or a halogen group, and a represents an integer from 1 to 3.

In formulas (2) and (3), $R^3$ and $R^5$ moieties are each a $C_{1-3}$ alkyl group or a $C_{6-30}$ aryl group, and bonded to a silicon atom via an Si—C bond, $R^4$ and $R^6$ moieties are each an alkoxy group, an acyloxy group, or a halogen group, Y is an alkylene group, an NH group, or an oxygen atom, b is an integer from 1 to 3, c is an integer 0 or 1, and d is an integer from 1 to 3.

The above alkyl group is a $C_{1-18}$ alkyl group. Examples include, but are not limited to, a methyl group, an ethyl group, an n-propyl group, an i-propyl group, a cyclopropyl group, an n-butyl group, an i-butyl group, an s-butyl group, a t-butyl group, a cyclobutyl group, a 1-methyl-cyclopropyl group, a 2-methyl-cyclopropyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a cyclopentyl group, a 1-methyl-cyclobutyl group, a 2-methyl-cyclobutyl group, a 3-methyl-cyclobutyl group, a 1,2-dimethyl-cyclopropyl group, a 2,3-dimethyl-cyclopropyl group, a 1-ethyl-cyclopropyl group, a 2-ethyl-cyclopropyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a cyclohexyl group, a 1-methyl-cyclopentyl group, a 2-methyl-cyclopentyl group, a 3-methyl-cyclopentyl group, a 1-ethyl-cyclobutyl group, a 2-ethyl-cyclobutyl group, a 3-ethyl-cyclobutyl group, a 1,2-dimethyl-cyclobutyl group, a 1,3-dimethyl-cyclobutyl group, a 2,2-dimethyl-cyclobutyl group, a 2,3-dimethyl-cyclobutyl group, a 2,4-dimethyl-cyclobutyl group, a 3,3-dimethyl-cyclobutyl group, a 1-n-propyl-cyclopropyl group, a 2-n-propyl-cyclopropyl group, a 1-i-propyl-cyclopropyl group, a 2-i-propyl-cyclopropyl group, a 1,2,2-trimethyl-cyclopropyl group, a 1,2,3-trimethyl-cyclopropyl group, a 2,2,3-trimethyl-cyclopropyl group, a 1-ethyl-2-methyl-cyclopropyl group, a 2-ethyl-1-methyl-cyclopropyl group, a 2-ethyl-2-methyl-cyclopropyl group, a 2-ethyl-3-methyl-cyclopropyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, or an octadecyl group.

In addition, examples of the alkylene group include an alkylene group derived from any of the alkyl groups mentioned above.

The aryl group above is a $C_{6-30}$ aryl group. Examples include a phenyl group, a naphthyl group, an anthracene group, or a pyrene group.

The alkenyl group is a $C_{2-10}$ alkenyl group. Examples include, but are not limited to, an ethenyl group, a 1-propenyl group, a 2-propenyl group, a 1-methyl-1-ethenyl group, a 1-butenyl group, a 2-butenyl group, a 3-butenyl group, a 2-methyl-1-propenyl group, a 2-methyl-2-propenyl group, a 1-ethylethenyl group, a 1-methyl-1-propenyl group, a 1-methyl-2-propenyl group, a 1-pentenyl group, a 2-pentenyl group, a 3-pentenyl group, a 4-pentenyl group, a 1-n-propyl ethenyl group, a 1-methyl-1-butenyl group, a 1-methyl-2 butenyl group, a 1-methyl-2-butenyl group, a 1-methyl-3-butenyl group, a 2-ethyl-2-propenyl group, a 2-methyl-1-butenyl group, a 2-methyl-2-butenyl group, a 2-methyl-3-butenyl group, a 3-methyl-1-butenyl group, a 3-methyl-2-butenyl group, a 3-methyl-3-butenyl group, a 1,1-dimethyl-2-propenyl group, a 1-i-propyl ethenyl group, a 1,2-dimethyl-1-propenyl group, a 1,2-dimethyl-2-propenyl group, a 1-cyclopentenyl group, a 2-cyclopentenyl group, a 3-cyclopentenyl group, a 1-hexenyl group, a 2-hexenyl group, a 3-hexenyl group, a 4-hexenyl group, a 5-hexenyl group, a 1-methyl-1-pentenyl group, a 1-methyl-2-pentenyl group, a 1-methyl-3-pentenyl group, a 1-methyl-4-pentenyl group, a 1-n-butyl ethenyl group, a 2-methyl-1-pentenyl group, or a 2-methyl-2-pentenyl group.

The above alkoxy group is, for instance, a $C_{1-10}$ alkoxy group. Examples include, but are not limited to, a methoxy group, an ethoxy group, an n-propoxy group, an i-propoxy group, an n-butoxy group, an i-butoxy group, an s-butoxy group, a t butoxy group, an n-pentyloxy group, a 1-methyl-n-butoxy group, a 2-methyl-n-butoxy group, a 3-methyl-n-butoxy group, a 1,1-dimethyl-n-propoxy group, a 1,2-dimethyl-n-propoxy group, a 2,2-dimethyl-n-propoxy group, a 1-ethyl-n-propoxy group, or an n-hexyloxy group.

The above acyloxy group is a $C_{2-10}$ acyloxy. Examples include, but are not limited to, a methylcarbonyloxy group, an ethylcarbonyloxy group, an n-propylcarbonyloxy group, an i-propylcarbonyloxy group, an n-butylcarbonyloxy group, an i-butylcarbonyloxy group, an s-butylcarbonyloxy group, a t-butylcarbonyloxy group, an n-pentylcarbonyloxy group, a 1-methyl-n-butylcarbonyloxy group, a 2-methyl-n-butylcarbonyloxy group, a 3-methyl-n-butylcarbonyloxy group, a 1,1-dimethyl-n-propylcarbonyloxy group, a 1,2-dimethyl-n-propylcarbonyloxy group, a 2,2-dimethyl-n-propylcarbonyloxy group, a 1-ethyl-n-propylcarbonyloxy group, an n-hexylcarbonyloxy group, a 1-methyl-n-pentylcarbonyloxy group, or a 2-methyl-n pentylcarbonyloxy group.

Examples of the above halogen group include fluorine, chlorine, bromine, or iodine.

Examples of the organic group with a polyether group include a polyether propyl group with an alkoxy group. An example is $(CH_3O)_3SiC_3H_6(OC_2H_4)_nOCH_3$. The n may be in the range of 1 to 100 or 1 to 10.

Examples of the organic group with an epoxy group include a 2-(3,4-epoxycyclohexyl)ethyl group or a 3-glycidoxypropyl group.

The above (meth)acryloyl group refers to both an acryloyl group and a methacryloyl group. Examples of the organic group with a (meth)acryloyl group include a 3-methacryloxypropyl group or a 3-acryloxypropyl group.

Examples of the organic group with a mercapto group include a 3-mercaptopropyl group.

Examples of the organic group with an amino group include a 2-aminoethyl group, a 3-aminopropyl group, an N-2-(aminoethyl)-3-aminopropyl group, an N-(1,3-dimethyl-butylidene)aminopropyl group, an N-phenyl-3-aminopropyl group, or an N-(vinylbenzyl)-2-aminoethyl-3-aminopropyl group.

Examples of the organic group with an ureido group include a 3-ureidopropyl group.

Examples of the organic group with a cyano group include a 3-cyanopropyl group.

Formulas (2) and (3) above preferably represent a compound that can form a trimethylsilyl group on the surface of silica particles.

Each compound can be exemplified below.

[Chemical Formula 3]

Formula (2-1)

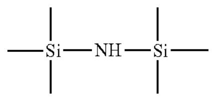

Formula (2-2)

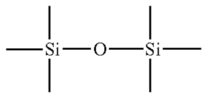

Formula (2-3)

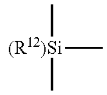

In the above formula, $R^{12}$ is an alkoxy group, and is, for example, a methoxy group or an ethoxy group. The above silane compounds used may be silane compounds manufactured by Shin-Etsu Chemical Co., Ltd.

In this step, hydroxyl groups on the surface of silica particles, such as silanol groups in the case of silica particles, react with the above silane compound to coat the silica particle surface with the above silane compound through siloxane linkage. The reaction can be carried out at temperatures ranging from 20° C. to the boiling point of the dispersing medium, e.g., from 20° C. to 100° C. The reaction time can be from about 0.1 to 6 hours.

The above silane compound can be added to the silica sol to coat the silica particle surface with a silane compound in an amount equivalent to a coating amount of 0.1 silicon atom/$nm^2$ to 6.0 silicon atoms/$nm^2$ in the silane compound as the coating amount on the silica particle surface.

Water is necessary for hydrolysis of the above silane compound, and an aqueous solvent is used if the sol contains the aqueous solvent. It is possible to use water remaining in the solvent when the aqueous medium is replaced by the organic solvent (C). For example, water present in the range of 0.01 to 1 mass % may be used. In addition, the hydrolysis can be performed with or without a catalyst.

In the case without a catalyst, the silica particle surface is on the acidic side. If a catalyst is used, examples of the hydrolysis catalyst include a metal chelate compound, an organic acid, an inorganic acid, an organic base, or an inorganic base. Examples of the metal chelate compound as the hydrolysis catalyst include triethoxy mono(acetylacetonato) titanium or triethoxy mono(acetylacetonato) zirconium. Examples of the organic acid as the hydrolysis catalyst include acetic acid or oxalic acid. Examples of the inorganic acid as the hydrolysis catalyst include hydrochloric acid, nitric acid, sulfuric acid, hydrofluoric acid, or phosphoric acid. Examples of the organic base as the hydrolysis catalyst include pyridine, pyrrole, piperazine, or a quaternary ammonium salt. Examples of the inorganic base as the hydrolysis catalyst include ammonia, sodium hydroxide, or potassium hydroxide.

The organic acid is at least one organic acid selected from the group consisting of divalent aliphatic carboxylic acids, aliphatic oxycarboxylic acids, amino acids, and chelating agents. The divalent aliphatic carboxylic acid may be oxalic acid, malonic acid, or succinic acid. The aliphatic oxycarboxylic acid may be glycolic acid, lactic acid, malic acid, tartaric acid, or citric acid. The amino acid may be glycine, alanine, valine, leucine, serine, or threonine. Examples of the chelating agent include ethylenediaminetetraacetic acid, L-aspartic acid-N,N-diacetic acid, or diethylenetriamine pentaacetic acid. Examples of the organic acid salt include an alkali metal salt, an ammonium salt, or an amine salt of each organic acid above. Examples of the alkali metal include sodium or potassium.

Examples of the phosphoric acid ester that can be used in the present invention include at least one phosphoric acid ester compound selected from the group consisting of formulas (4) to (6).

In formulas (4) to (6), $X_1$, $X_2$, and $X_3$ each represent a $C_{2-20}$ alkylene group, f, h, and j each represent an integer from 1 to 100, e, g, and i each represent an integer from 1 to 3, and $Y_1$, $Y_2$, and $Y_3$ each represent a hydrogen atom, a $C_{1-20}$ alkyl group, a $C_{2-20}$ alkenyl group, or a (meth)acrylic group.

The phosphoric acid ester used may be a polyoxyethylene alkyl ($C_{6-20}$) ether phosphoric acid ester having a $C_{6-20}$ alkyl group.

The phosphoric acid ester used may preferably be a polyoxyethylene alkyl ether phosphoric acid ester. The phosphoric acid ester above can be a phosphoric acid ester in which the terminal alkyl group ($Y_1$) of the above formula (4) has 6 to 10 or 12 to 15 carbon atoms. These products used may be, for example, Phosphanol (trade name) RA-600 and RS-610 manufactured by TOHO Chemical Industry Co., Ltd.

The present invention provides a core-shell type metal oxide sol comprising, as a dispersing matter, the core-shell type metal oxide particle as dispersed in a dispersing medium comprising an alcohol optionally having an ether bond, an ester, a ketone, an amide, a hydrocarbon, a silicone, a compound containing an unsaturated bond between chain carbon atoms, an oxirane compound, water, or any combination thereof, wherein an average particle diameter thereof is from 5 to 500 nm, from 10 to 200 nm, from 10 to 100 nm, from 10 to 60 nm, from 10 to 40 nm, or from 10 to 30 nm as measured by a dynamic light scattering method.

The dispersing medium used in the present invention is water or an organic solvent. Examples of the $C_{1-10}$ alcohol include methanol, ethanol, n-propanol, i-propanol, n-butanol, isobutanol, n-pentanol, ethylene glycol ethylene glycol monomethyl ether, propylene glycol monomethyl ether, propylene glycol monoethyl ether, or propylene glycol monopropyl ether.

The ketone is a linear or cyclic $C_{3-30}$ aliphatic ketone. Examples include methyl ethyl ketone, diethyl ketone, methyl propyl ketone, methyl isobutyl ketone, diisopropyl ketone, diisobutyl ketone, methyl amyl ketone, or cyclohexanone.

The ether is a linear or cyclic $C_{3-30}$ aliphatic ether. Examples include diethyl ether or tetrahydrofuran.

The ester is a linear or cyclic $C_{2-30}$ ester. Examples include ethyl acetate, n-butyl acetate, sec-butyl acetate, methoxybutyl acetate, amyl acetate, n-propyl acetate, isopropyl acetate, ethyl lactate, butyl lactate, ethylene glycol monomethyl ether acetate, propylene glycol monomethyl ether acetate, propylene glycol monopropyl ether acetate, phenyl acetate phenyl lactate, or phenyl propionate.

The amide is a $C_{3-30}$ aliphatic amide. Examples include dimethylacetamide, dimethylformamide, N-methylpyrrolidone, or N-ethylpyrrolidone.

The hydrocarbon is a linear or cyclic $C_{6-30}$ aliphatic or aromatic hydrocarbon. Examples include hexane, heptane, octane, nonane, decane, benzene, toluene, or xylene.

As a surfactant used in the present invention, it is possible to use an anionic surfactant, a cationic surfactant, an amphoteric surfactant, or a nonionic surfactant.

Examples of the anionic surfactant used in the present invention include a sodium or potassium salt of fatty acid, an alkyl benzene sulfonate, a higher alcohol sulfate, a polyoxyethylene alkyl ether sulfate, an α-sulfo fatty acid ester, an α-olefin sulfonate, a mono-alkyl phosphate, or an alkane sulfonate.

Examples of the alkylbenzenesulfonate include a sodium salt, a potassium salt, or a lithium salt. Examples include sodium $C_{10}$-$C_{16}$ alkylbenzenesulfonate, $C_{10}$-$C_{16}$ alkylbenzenesulfonate, or sodium alkylnaphthalene sulfonate.

Examples of the higher alcohol sulfate include sodium dodecyl sulfate (sodium lauryl sulfate) with 12 carbon atoms, triethanolamine lauryl sulfate, or triethanol ammonium lauryl sulfate.

The polyoxyethylene alkyl ether sulfate is, for instance, sodium polyoxyethylene styrenylated phenyl ether sulfate, ammonium polyoxyethylene styrenylated phenyl ether sulfate, sodium polyoxyethylene decyl ether sulfate, ammonium polyoxyethylene decyl ether sulfate, sodium polyoxyethylene lauryl ether sulfate, ammonium polyoxyethylene lauryl ether sulfate, sodium polyoxyethylene tridecyl ether sulfate, or sodium polyoxyethylene oleyl cetyl ether sulfate.

The α-olefin sulfonate is, for instance, sodium α-olefin sulfonate.

Examples of the alkane sulfonate include sodium 2-ethylhexyl sulfate.

Examples of the cationic surfactant used in the present invention include an alkyl trimethyl ammonium salt, a dialkyl dimethyl ammonium salt, an alkyl dimethyl benzyl ammonium salt, or an amine salt-based agent.

The alkyltrimethyl ammonium salt is a quaternary ammonium salt and has a chlorine or bromine ion as a counter ion. Examples include dodecyltrimethylammonium chloride, cetyltrimethylammonium chloride, palm alkyltrimethylammonium chloride, or alkyl ($C_{16-18}$) trimethylammonium chloride.

The dialkyl dimethyl ammonium salt has two lipophilic main chains and two methyl groups. Examples include bis(hydrogenated beef tallow) dimethylammonium chloride. Examples include didecyldimethylammonium chloride, dipalm alkyl dimethylammonium chloride, hardened beef tallow alkyl dimethylammonium chloride, or dialkyl ($C_{14-18}$) dimethylammonium chloride.

The alkyl dimethyl benzyl ammonium salt is a quaternary ammonium salt with one lipophilic main chain, two methyl groups, and a benzyl group, and examples include benzalkonium chloride. Examples include alkyl ($C_{8-18}$) dimethylbenzylammonium chloride. The amine salt-based agent is those in which the hydrogen atom of ammonia is replaced by one or more hydrocarbon groups. Examples include N-methyl-bis-hydroxyethylamine fatty acid ester hydrochloride.

Examples of the amphoteric surfactant used in the present invention include an N-alkyl-β-alanine-type alkylamino fatty acid salt, an alkyl carboxybetaine-type alkyl betaine, or an N,N-dimethyldodecyl amine oxide-type alkyl amine oxide. Examples thereof include lauryl betaine, stearyl betaine, 2-alkyl-N-carboxymethyl-N-hydroxyethyl imidazolinium betaine, or lauryl dimethyl amine oxide.

The nonionic surfactant used in the present invention is selected from the group consisting of polyoxyethylene alkyl ethers, polyoxyethylene alkyl phenol ethers, alkyl glucosides, polyoxyethylene fatty acid esters, sucrose fatty acid esters, sorbitan fatty acid esters, polyoxyethylene sorbitan fatty acid esters, and fatty acid alkanolamides. Examples of the polyoxyethylene alkyl ether include polyoxyethylene dodecyl ether (polyoxyethylene lauryl ether), polyoxyalkylene lauryl ether, polyoxyethylene tridecyl ether, polyoxyalkylene tridecyl ether, polyoxyethylene myristyl ether, polyoxyethylene cetyl ether, polyoxyethylene oleyl ether, polyoxyethylene stearyl ether, polyoxyethylene behenyl ether, polyoxyethylene-2-ethylhexyl ether, or polyoxyethylene isodecyl ether.

Examples of the polyoxyethylene alkylphenol ether include polyoxyethylene styrenylated phenyl ether, polyoxyethylene nonylphenyl ether, polyoxyethylene distyrenylated phenyl ether, or polyoxyethylene tribenzylphenyl ether.

Examples of the alkyl glucoside include decyl glucoside or lauryl glucoside.

Examples of the polyoxyethylene fatty acid ester include polyoxyethylene monolaurate, polyoxyethylene monostearate, polyoxyethylene monooleate, polyethylene glycol distearate, polyethylene glycol diolate, or polypropylene glycol diolate.

Examples of the sorbitan fatty acid ester include sorbitan monocaprylate, sorbitan monolaurate, sorbitan monomyristate, sorbitan monopalmitate, sorbitan monostearate, sorbitan distearate, sorbitan tristearate, sorbitan monooleate, sorbitan triolate sorbitan triolate, sorbitan monosesquioxide, or an ethylene oxide adduct thereof.

Examples of the polyoxyethylene fatty acid ester include polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan triolate, or polyoxyethylene sorbitan triisostearate.

Examples of the fatty acid alkanolamide include coconut oil fatty acid diethanolamide, beef tallow fatty acid diethanolamide, lauric acid diethanolamide, or oleic acid diethanolamide.

Additional examples include polyoxyethylene polyoxypropylene glycol, polyoxyalkyl ether or polyoxyalkyl glycol (e.g., polyoxyethylene fatty acid ester), polyoxyethylene hardened castor oil ether, sorbitan fatty acid ester alkyl ether, alkyl polyglucoside, sorbitan monooleate, or sucrose fatty acid ester.

In the present invention, a composition (varnish) comprising the core-shell type metal oxide particle(s) and a thermosetting or photocurable resin are obtained.

The composition of the present invention can be further mixed with a thermosetting or photocurable resin to produce a varnish.

In the present invention, a film-forming composition containing the above-mentioned organic solvent sol(s) and organic resin is obtained. The film-forming composition can be made into a film-forming composition containing the core-shell type metal oxide particle(s) and organic resin by removing the organic solvent in the organic solvent sol.

In the case of a thermosetting film-forming composition, a thermosetting agent can be added in the range of 0.01 to 50 phr, or 0.01 to 10 phr to a resin containing a functional group such as an epoxy group or a (meth)acryloyl group. For example, 0.5 to 1.5 equivalents, preferably 0.8 to 1.2 equivalents, of the thermosetting agent can be included for the functional group such as an epoxy group or a (meth)acryloyl group. The equivalent amount of the thermosetting agent with respect to the curable resin is indicated by the ratio of the equivalent amount of the thermosetting agent with respect to the functional group.

Examples of the thermosetting agent include a phenolic resin, an amine-based curing agent, a polyamide resin, imidazoles, polymercaptan, an acid anhydride, a thermal radical generator, or a thermal acid generator. Particularly preferred is a radical generator-based curing agent, an acid anhydride-based curing agent, or an amine-based curing agent.

These thermosetting agents can be used by dissolving them in a solvent in the case of a solid one. However, the evaporation of the solvent causes a decrease in the density of the cured material and the formation of pores causes a decrease in strength and water resistance. For this reason, the curing agent itself should be liquid at room temperature and under normal pressure.

Examples of the phenolic resin include phenolic novolac resin or cresol novolac resin.

Examples of the amine-based curing agent include piperidine, N,N-dimethylpiperazine, triethylenediamine, 2,4,6-tris(dimethylaminomethyl) phenol, benzyl dimethylamine, 2-(dimethylaminomethyl) phenol, diethylenetriamine, triethylenetetetramine, tetraethylenepentamine, diethylaminopropylamine, N-aminoethylpiperazine, di(1-methyl-2-aminocyclohexyl) methane, mencendiamine, isofluorodiamine, diaminodicyclohexylmethane, 1,3-diaminomethylcyclohexane, xylenediamine, methaphenylenediamine, diaminodiphenylmethane, diaminodiphenylsulfone, 3,3'-diethyl-4,4'-diaminodiphenylmethane, or diethyltoluenediamine. Among them, a liquid one can be preferably used, including diethylenetriamine, triethylenetetramine, tetraethylenepentamine, diethylaminopropylamine, N-aminoethylpiperazine, di(1-methyl-2-aminocyclohexyl) methane, mencendiamine, isofluorodiamine, diaminodicyclohexylmethane, 3,3'-diethyl-4,4'-diaminodiphenylmethane, or diethyltoluene diamine.

The polyamide resin is formed by the condensation of dimeric acid and polyamine, and is a polyamide amine with primary and secondary amines in the molecule.

Examples of the imidazoles include 2-methylimidazole, 2-ethyl-4-methylimidazole, 1-cyanoethyl-2-undecylimidazolium trimellitate, or an epoxyimidazole adduct.

The polymercaptan, for example, has a mercaptan group at the end of a polypropylene glycol chain or has a mercaptan group at the end of a polyethylene glycol chain, and a liquid form is preferred.

A preferable acid anhydride-based curing agent is an anhydride of a compound having multiple carboxyl groups in one molecule. Examples of the acid anhydride-based curing agent include phthalic anhydride, trimellitic anhydride, pyromellitic anhydride, benzophenone tetracarboxylic anhydride, ethylene glycol bis-trimellitate, glycerol tris-trimellitate, maleic anhydride, tetrahydro phthalic anhydride, methyl tetrahydro phthalic anhydride, endomethylenetetrahydro phthalic anhydride, methyl endomethylenetetrahydro phthalic anhydride, methyl butenyl tetrahydro phthalic anhydride, dodecenyl succinic anhydride, hexahydro phthalic anhydride, methyl hexahydro phthalic anhydride, succinic anhydride, methylcyclohexenedicarboxylic anhydride, or chlorendic anhydride.

Examples of the thermal acid generator include a sulfonium salt or a phosphonium salt. A sulfonium salt is preferably used. For example, the following compounds can be used as examples.

[Chemical Formula 4]

Formula (C-1)

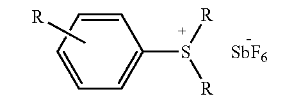

Formula (C-2)

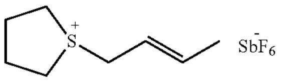

Examples of R include a $C_{1-12}$ alkyl group or a $C_{6-20}$ aryl group. Particularly preferred is a $C_{1-12}$ alkyl group.

Among these, preferred is a liquid one at room temperature and at normal pressure, including methyl tetrahydro phthalic anhydride, methyl-5-norbornene-2,3-dicarboxylic anhydride (methyl nadic anhydride, methyl hymic anhydride), methyl hydrogenated nadic anhydride, methyl butenyl tetrahydro phthalic anhydride, dodecenyl succinic anhydride, methyl hexahydro phthalic anhydride, or a mixture of methyl hexahydro phthalic anhydride and hexahydro phthalic anhydride. These liquid acid anhydrides have viscosities ranging from 10 mPa·s to 1000 mPa·s as measured at 25° C.

Examples of the thermal radical generator include 2,2'-azobis(isobutyronitrile), 2,2'-azobis(2-methylbutyronitrile), 2,2'-azobis(2,4-dimethylvaleronitrile), 4,4'-azobis(4-cyanovaleric acid), 2,2'-azobis(2-methylpropionic acid)dimethyl, 2,2'-azobis(2-methylpropionamidine) dihydrochloride, 2,2'-azobis[2-(2-imidazolin-2-yl) propane] dihydrochloride, tert-butyl hydroperoxide, cumene hydroperoxide, di-tert-butyl peroxide, dicumyl peroxide, or benzoyl peroxide. They can be obtained from TOKYO CHEMICAL INDUSTRY CO., LTD.

In addition, when the above cured material is obtained, a curing aid may be used in combination, if appropriate. Examples of the curing aid include an organophosphorous compound (e.g., triphenylphosphine, tributylphosphine), a quaternary phosphonium salt (e.g., ethyltriphenylphosphonium bromide, methyltriphenylphosphonium diethyl phosphate), 1,8-diazabicyclo(5,4,0)undecan-7-ene, a salt of 1,8-diazabicyclo(5,4,0)undecan-7-ene and octylic acid, zinc octylate, or a quaternary ammonium salt (e.g., tetrabutylammonium bromide). Each curing aid can be included at a ratio of 0.001 to 0.1 parts by mass based on 1 part by mass of the curing agent.

The composition is obtained by mixing a resin and a curing agent optionally with a curing aid to make a thermosetting varnish. The mixing can be performed in a reaction vessel using a stirring blade or kneader.

The mixing is carried out by heat mixing at a temperature of 60° C. to 100° C. for 0.5 to 1 hour.

The resulting curable film-forming composition is a thermosetting coating composition and has an appropriate viscosity for use as a liquid sealant, for example. The liquid thermosetting film-forming composition can be prepared to any viscosity, and can be used as a transparent sealant for an LED or others to partially seal any site thereof by, for instance, casting, potting, dispensing, or printing. The liquid thermosetting composition is directly applied on an LED or the like in the liquid state in the manner described above, dried, and then cured to produce an epoxy resin cured body.

The thermosetting film-forming composition (thermosetting coating composition) is applied to a base material and heated at a temperature of 80 to 200° C. to obtain a cured product.

In the case of a photo-curable resin composition, a photo-curing agent (photo-radical generator, photo acid generator) can be added in the range of 0.01 to 50 phr, or 0.01 to 10 phr to a resin containing a functional group (e.g., an epoxy group or a (meth)acryloyl group) in the above film-forming composition. For example, 0.5 to 1.5 equivalents, preferably 0.8 to 1.2 equivalents, of the photo-curing agent (photo-radical generator, photo acid generator) can be included for the functional group such as an epoxy group or a (meth)acryloyl group. The equivalent amount of the photo curing agent with respect to the curable resin is indicated by the ratio of the equivalent amount of the photo curing agent with respect to the functional group.

The photo-radical generator is not particularly limited as long as radicals are generated directly or indirectly upon light irradiation.

Examples of the photo-radical generator as a photo-radical polymerization initiator include an imidazole compound, a diazo compound, a bisimidazole compound, an N-arylglycine compound, an organic azide compound, a titanocene compound, an aluminate compound, an organic peroxide, an N-alkoxypyridinium salt compound, or a thioxanthone compound. Examples of the azide compound include p-azidobenzaldehyde, p-azidoacetophenone, p-azidobenzoic acid, p-azidobenzalacetophenone, 4,4'-diazidochalcone, 4,4'-diazidodiphenyl sulfide, or 2,6-bis(4'-azidobenzal)-4-methylcyclohexanone. Examples of the diazo compound include 1-diazo-2,5-diethoxy-4-p-tolylmercaptobenzeneborofluoride, 1-diazo-4-N,N-dimethylaminobenzene chloride, or 1-diazo-4-N,N-diethylaminobenzeneborofluoride.

Examples of the bisimidazole compound include 2,2'-bis(o-chlorophenyl)-4,5,4',5'-tetrakis(3,4,5-trimehoxyphenyl) 1,2'-bisimidazole, or 2,2'-bis(o-chlorophenyl) 4,5,4',5'-tetraphenyl-1,2'-bisimidazole. Examples of the titanocene compound include dicyclopentadienyl-titanium-dichloride, dicyclopentadienyl-titanium-bisphenyl, dicyclopentadienyl-titanium-bis(2,3,4,5,6-pentafluorophenyl), dicyclopentadienyl-titanium-bis(2,3,5,6-tetrafluorophenyl), dicyclopentadienyl-titanium-bis(2,4,6-trifluorophenyl), dicyclopentadienyl-titanium-bis(2,6-difluorophenyl), dicyclopentadienyl-titanium-bis(2,4-difluorophenyl), bis(methylcyclopentadienyl)-titanium-bis(2,3,4,5,6-pentafluorophenyl), bis(methylcyclopentadienyl)-titanium-bis(2,3,5,6-tetrafluorophenyl), bis(methylcyclopentadienyl)-titanium-bis(2,6-difluorophenyl), or dicyclopentadienyl-titanium-bis(2,6-difluoro-3-(1H-pyrrol-1-yl)-phenyl).

In addition, examples of the photo-radical generator include 1,3-di(tert-butyldioxycarbonyl)benzophenone, 3,3',4,4'-tetrakis(tert-butyldioxycarbonyl)benzophenone, 3-phenyl-5-isoxazolone, 2-mercaptobenzimidazole, 2,2-dimethoxy-1,2-diphenylethan-1-one, 1-hydroxy-cyclohexyl-phenyl-ketone, or 2-benzyl-2-dimethylamino-1-(4-morpholinophenyl)-butanone.

Examples of the photo-radical polymerization agent available include Irgacure TPO (trade name) (ingredient: 2,4,6-trimethylbenzoyl diphenylphosphine oxide) (c1-1-1) manufactured by BASF; Omnirad 819 (trade name) (ingredient: bis(2,4,6-trimethylbenzoyl)phenylphosphine oxide) (c1-1-2) manufactured by IGM RESINS; or Irgacure 184 (trade name) (ingredient: 1-hydroxycyclohexylphenyl ketone) (c1-1-3) manufactured by IGM RESINS.

[Chemical Formula 5]

Formula (c1-1-1)

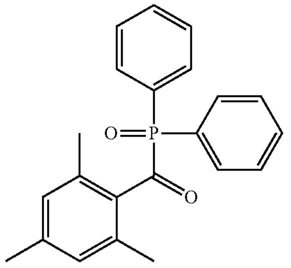

Formula (c1-1-2)

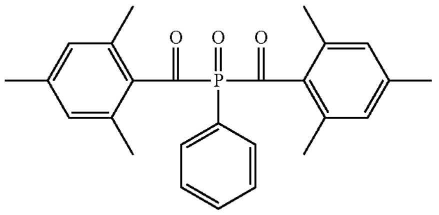

Formula (c1-1-3)

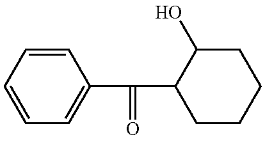

The photo acid generator is not particularly limited as long as an acid is generated directly or indirectly upon light irradiation.

Specific examples of the photo acid generator that can be used include a triazine compound, an acetophenone derivative compound, a disulfone-based compound, a diazomethane-based compound, a sulfonic acid derivative compound, an onium salt (e.g., an iodonium salt, a sulfonium salt, a phosphonium salt, a selenium salt), a metallocene complex, or an iron arene complex.

The onium salt may be used as the above photo acid generator. Examples of the iodonium salt include diphenyliodonium chloride, diphenyliodonium trifluoromethanesulfonate, diphenyliodonium mesylate, diphenyliodonium tosylate, diphenyliodonium bromide, diphenyliodonium tetrafluoroborate, diphenyliodonium hexafluoroantimonate, diphenyliodonium hexafluoroarsenate, bis(p-tert-butylphenyl) iodonium hexafluorophosphate, bis(p-tert-butylphenyl) iodonium mesylate, bis(p-tert-butylphenyl) iodonium tosylate, bis(p-tert-butylphenyl) iodonium trifluoromethanesulfonate, bis(p-tert-butylphenyl) iodonium tetrafluoroborate, bis(p-tert-butylphenyl) iodonium chloride, bis(p-chlorophenyl) iodonium chloride, or bis(p-chlorophenyl) iodonium tetrafluoroborate. Additional examples include a bis(alkylphenyl) iodonium salt (e.g., bis(4-t-butylphenyl) iodonium hexafluorophosphate), an alkoxycarbonylalkoxytrialkylaryliodonium salt (e.g., 4-[(1-ethoxycarbonyl-ethoxy)phenyl]-(2,4,6-trimethylphenyl)-iodonium hexafluorophosphate), or a bis(alkoxyaryl) iodonium salt (e.g., a bis(alkoxyphenyl) iodonium salt such as (4-methoxyphenyl)phenyliodonium hexafluoroantimonate).

Examples of the sulfonium salt include a triphenylsulfonium salt (e.g., triphenylsulfonium chloride, triphenylsulfonium bromide, tri(p-methoxyphenyl) sulfonium tetrafluoroborate, tri(p-methoxyphenyl) sulfonium hexafluorophosphonate, tri(p-ethoxyphenyl) sulfonium tetrafluoroborate, triphenylsulfonium triflate, triphenylsulfonium hexafluoroantimonate, triphenylsulfonium hexafluorophosphate), (4-phenylthiophenyl)diphenylsulfonium hexafluoroantimonate, (4-phenylthiophenyl)diphenylsulfonium hexafluorophosphate, bis[4-(diphenylsulfonio)phenyl] sulfide-bis-hexafluoroantimonate, bis[4-(diphenylsulfonio) phenyl]sulfide-bis-hexafluorophosphate, (4-methoxyphenyl)diphenylsulfonium hexafluoroantimonate).

Examples of the phosphonium salt include triphenylphosphonium chloride, triphenylphosphonium bromide, tri(p-methoxyphenyl)phosphonium tetrafluoroborate, tri(p-methoxyphenyl)phosphonium hexafluorophosphonate, tri (p-ethoxyphenyl)phosphonium tetrafluoroborate, 4-chlorobenzenediazonium hexafluorophosphate, or benzyltriphenylphosphonium hexafluoroantimonate.

Other examples include a selenium salt (e.g., triphenylselenium hexafluorophosphate) or a metallocene complex (e.g., ($\eta^5$ or $\eta^6$-isopropylbenzene) (η5-cyclopentadienyl) iron (II) hexafluorophosphate).

The following compounds can also be each used as a photo acid generator.

[Chemical Formula 6]

Formula (A-1)

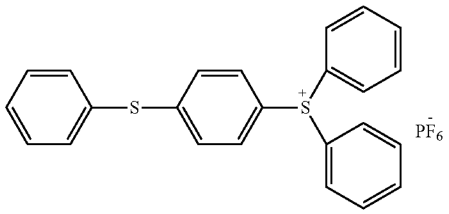

Formula (A-2)

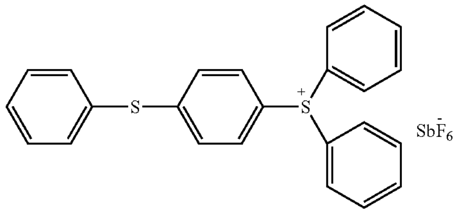

Formula (A-3)

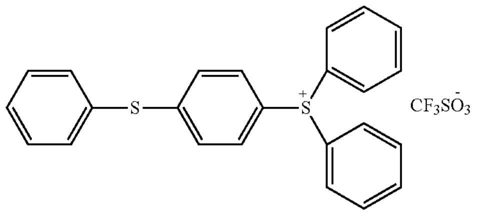

Formula (A-4)

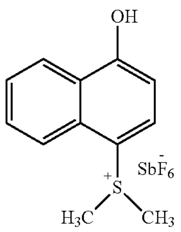

-continued

Formula (A-5)

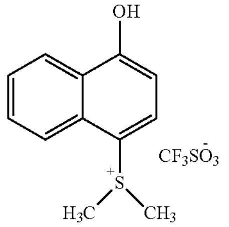

Formula (A-6)

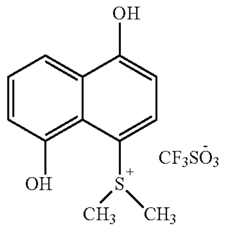

Formula (A-7)

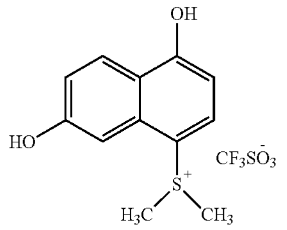

[Chemical Formula 7]

Formula (A-8)

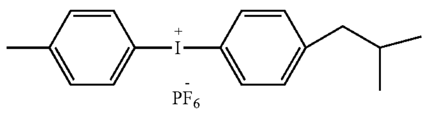

Formula (A-9)

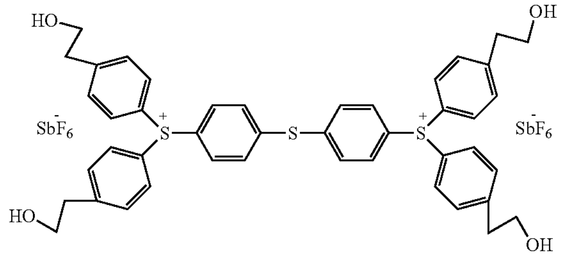

Formula (A-10)

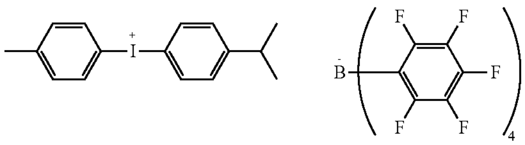

[Chemical Formula 8]

Formula (B-1)

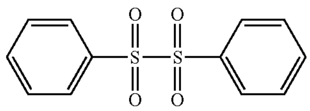

Formula (B-2)

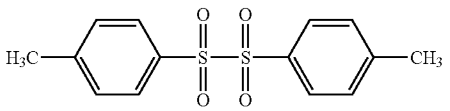

-continued
Formula (B-3)
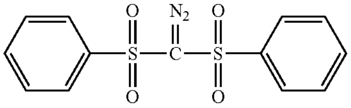
Formula (B-4)
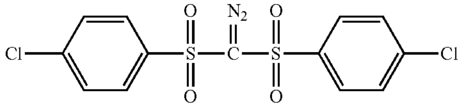
Formula (B-5)
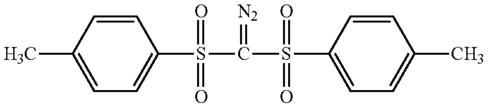
Formula (B-6)
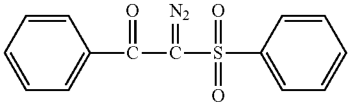
Formula (B-7)
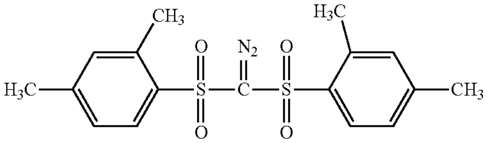
Formula (B-8)
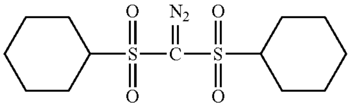
Formula (B-9)
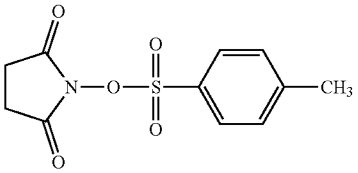
Formula (B-10)
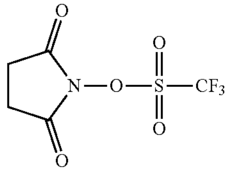
Formula (B-11)
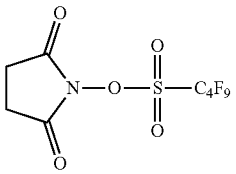
Formula (B-12)
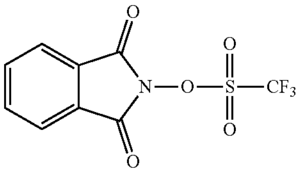
-continued
[Chemical Formula 9]
Formula (B-13)
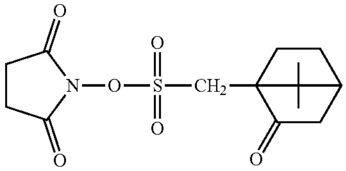
Formula (B-14)
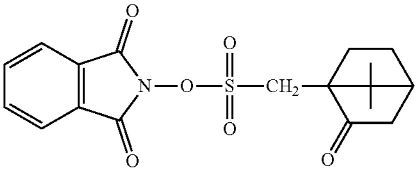
Formula (B-15)
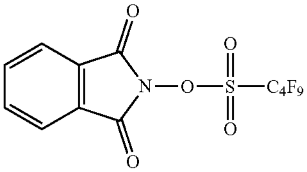
Formula (B-16)
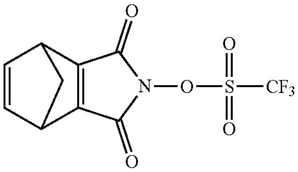
Formula (B-17)
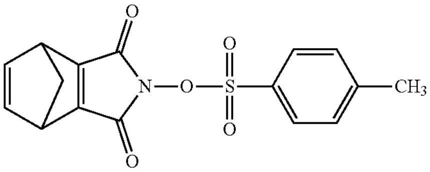
Formula (B-18)
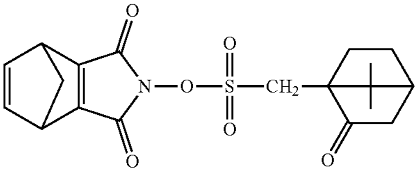
Formula (B-19)
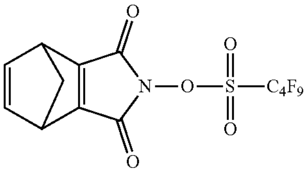
[Chemical Formula 10]
Formula (B-20)
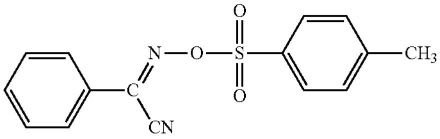

-continued
Formula (B-21)
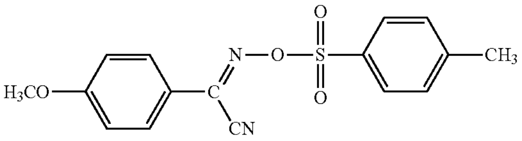
Formula (B-22)
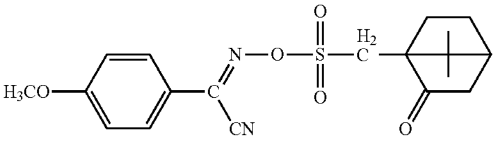
Formula (B-23)
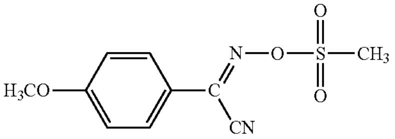
Formula (B-24)
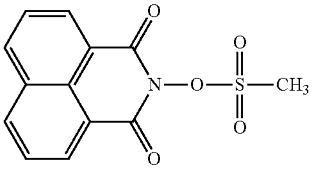
Formula (B-25)
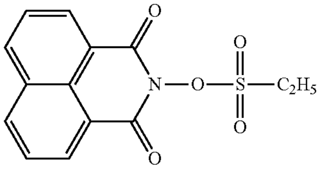
Formula (B-26)
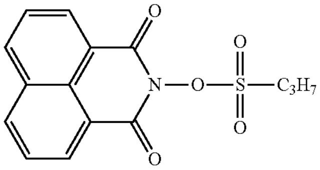
Formula (B-27)
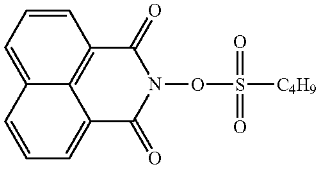
Formula (B-28)
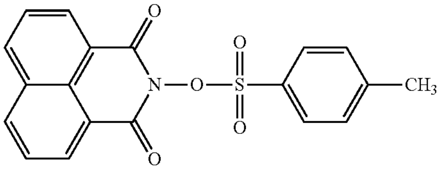
Formula (B-29)
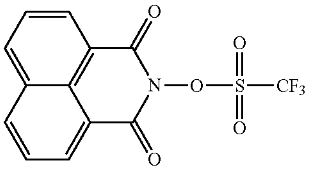
-continued
[Chemical Formula 11]
Formula (B-30)
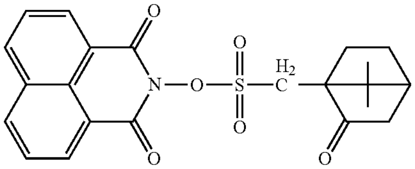
Formula (B-31)
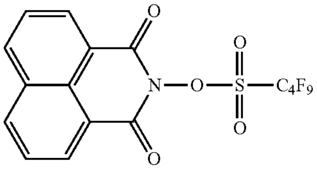
Formula (B-32)
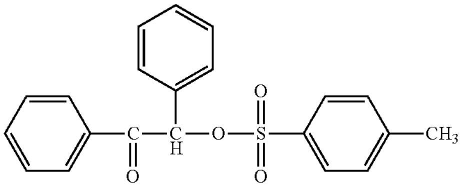
Formula (B-33)
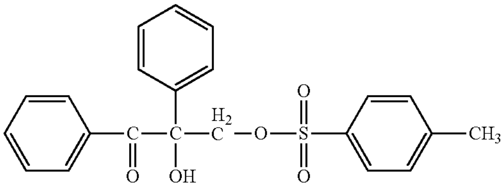
Formula (B-34)
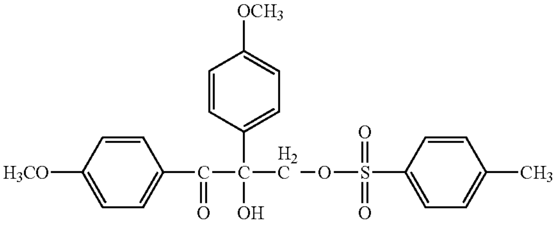
Formula (B-35)
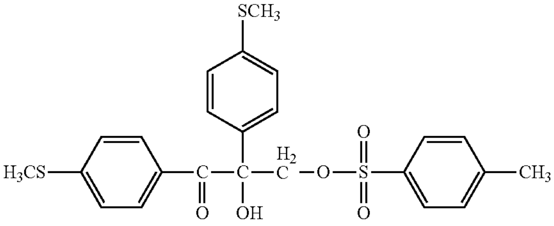
[Chemical Formula 12]
Formula (B-36)
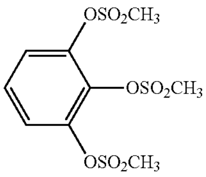

-continued
Formula (B-37)
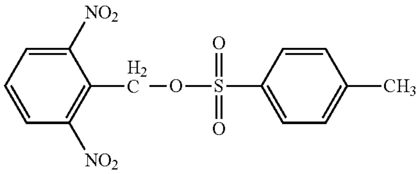
Formula (B-38)
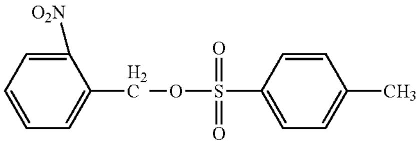
Formula (B-39)
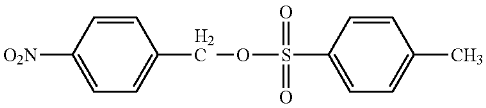
Formula (B-40)
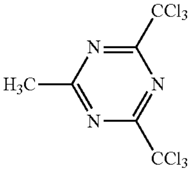
Formula (B-41)
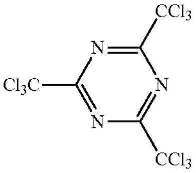
Formula (B-42)
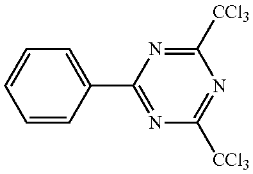
Formula (B-43)
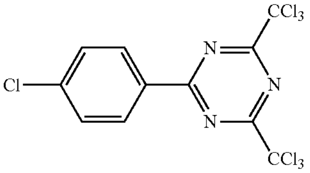
Formula (B-44)
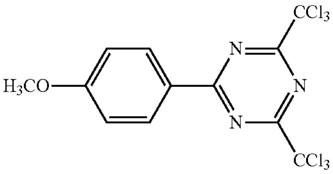
Formula (B-45)
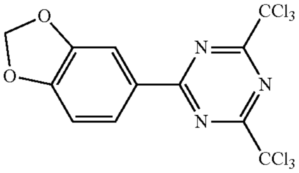
-continued
Formula (B-46)
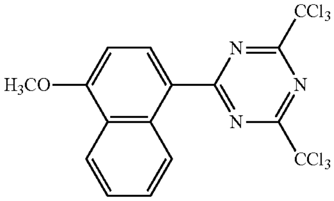
Formula (B-47)
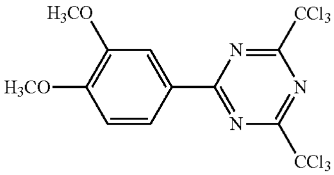
[Chemical Formula 13]
Formula (B-48)
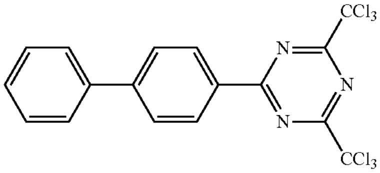
Formula (B-49)
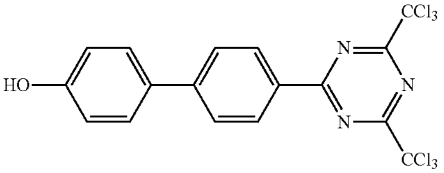
Formula (B-50)
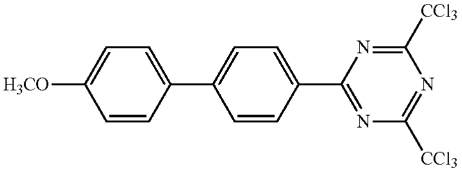
Formula (B-51)
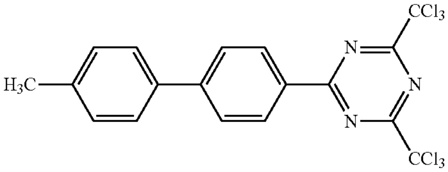
[Chemical Formula 14]
Formula (B-52)
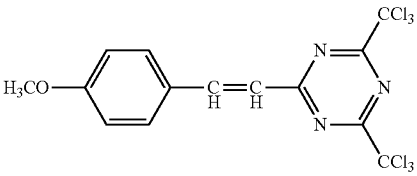
Formula (B-53)
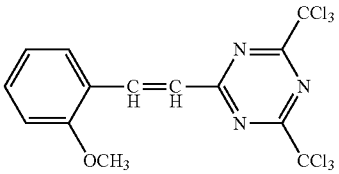

-continued

Formula (B-54)

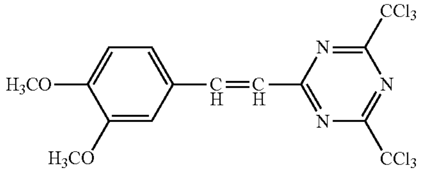

Formula (B-55)

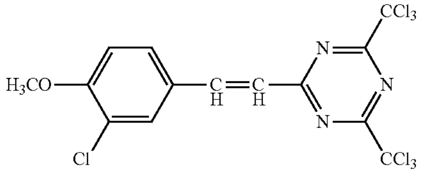

Formula (B-56)

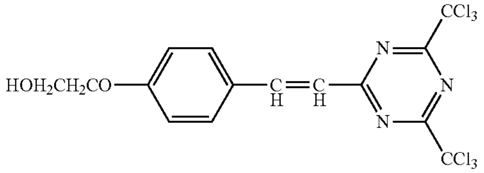

Formula (B-57)

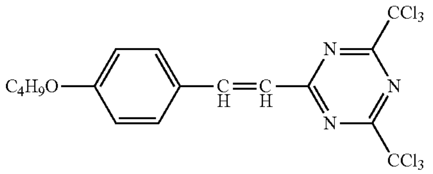

The photo acid generator is preferably a sulfonium salt compound or an iodonium salt compound. Examples of the anion species thereof include $CF_3SO_3^-$, $C_4F_9SO_3^-$, $C_8F_{17}SO_3^-$, a camphorsulfonic acid anion, a tosylic acid anion, $BF_4^-$, $PF_6^-$, $AsF_6^-$, or $SbF_6^-$. Particularly preferred is a strongly acidic anionic species (e.g., phosphorus hexafluoride, antimony hexafluoride).

The film-forming composition of the present invention may contain a conventional additive(s) as needed. Examples of such an additive include a pigment, a colorant, a thickener, a sensitizer, a defoamer, a coating performance improver, a lubricant, a stabilizer (e.g., an antioxidant, a heat stabilizer, a light stabilizer), a plasticizer, a dissolution accelerator, a filler, and/or an antistatic agent. These additives may be used singly or two or more kinds thereof may be used in combination.

Examples of the method of applying a film-forming composition of the present invention include flow coating, spin coating, spray coating, screen printing, casting, bar coating, curtain coating, roll coating, gravure coating, dipping, or slitting.

In the present invention, a photocoating composition (film-forming composition) may be applied onto a substrate and then cured by light irradiation. It can also be heated before and/or after light irradiation.

The thickness of the coating film depends on application of the resulting cured product and can be selected from a range of about 0.01 μm to 10 mm. For example, in the case of use for photoresists, the thickness may be from 0.05 to 10 μm (especially from 0.1 to 5 μm).

In the case of use for printed wiring boards, the thickness can be from about 5 μm to 5 mm (especially from 100 μm to 1 mm). In the case of use for optical thin films, the thickness can be from about 0.1 to 100 μm (especially from 0.3 to 50 μm).

When a transparent film is obtained, the visible light transmittance of the film can be 80% or more or 90% or more, typically from 90 to 96%.

When a photo acid generator is used, the light for irradiation or exposure may be, for example, gamma rays, X-rays, UV light, or visible light, and is usually visible light or UV light, and may be often especially UV light. The wavelength of the light is, for example, from 150 to 800 nm, preferably from 150 to 600 nm, and more preferably from 150 to 400 nm. The irradiation light intensity varies depending on the thickness of the coating film, but can be from 2 to 20,000 $mJ/cm^2$ and preferably from 5 to 5,000 $mJ/cm^2$. The light source can be selected according to the type of light for exposure. For example, in the case of UV light, it is possible to use, for instance, a low-pressure mercury lamp, a high-pressure mercury lamp, an ultra high-pressure mercury lamp, a deuterium lamp, a halogen lamp, or a laser beam (e.g., a helium-cadmium laser, an excimer laser). Such light irradiation causes the curing reaction of the above composition to proceed.

Heating of the coating film in the case of using a thermal acid generator and/or in need after light irradiation while using a photo acid generator is carried out, for example, at 60 to 350° C. and preferably about 100 to 300° C. The heating time can be selected from a range of 3 seconds or more (e.g., 3 seconds to 5 hours), e.g., 5 seconds to 2 hours, preferably 20 seconds to 30 minutes, and usually 1 minute to 3 hours (e.g., 5 minutes to 2.5 hours).

Further, when a pattern or image is formed (for example, when a printed wiring board is manufactured), the pattern may be exposed on the coating film formed on the substrate. This pattern exposure may be performed by laser beam scanning or by light irradiation through a photomask. The pattern or image can be formed by developing (or dissolving), with a developer, the non-exposed areas (unexposed areas) generated by such pattern exposure.

The developer used may be an alkaline solution or an organic solvent.

Examples of the alkaline solution include an aqueous solution of alkali metal hydroxide (e.g., potassium hydroxide, sodium hydroxide, potassium carbonate, sodium carbonate), an aqueous solution quaternary of ammonium hydroxide (e.g., tetramethylammonium hydroxide, tetraethylammonium hydroxide, choline), or an aqueous amine solution containing, for example, ethanolamine, propylamine, or ethylenediamine.

The above alkaline developer is generally an aqueous solution in an amount of 10 mass % or less and preferably from 0.1 to 3.0 mass %. In addition, the above developer may be added an alcohol compound and/or a surfactant, and be then used. Each of them is preferably from 0.05 to 10 parts by mass based on 100 parts by mass of the developer.

Among them, the tetramethylammonium hydroxide used may be a 0.1-2.38 mass % aqueous solution.

In addition, the developer organic solvent used may be a common organic solvent. Examples include acetone, acetonitrile, toluene, dimethylformamide, methanol, ethanol, isopropanol, propylene glycol methyl ether, propylene glycol ethyl ether, propylene glycol propyl ether, propylene glycol butyl ether, propylene glycol methyl ether acetate, propylene glycol ethyl ether acetate, propylene glycol propyl ether acetate, propylene glycol butyl ether acetate, ethyl lactate, or cyclohexanone. They can be used singly or a mixture of two or more of these may be used. In particular, propylene glycol methyl ether, propylene glycol methyl ether acetate, ethyl lactate, or the like may be preferably used.

In the present invention, an adhesion promoter can be added to improve the adhesion to the substrate after development. Examples of the adhesion promoter include: chlorosilanes (e.g., trimethylchlorosilane, dimethylvinylchlorosilane, methyldiphenylchlorosilane, chloromethyl dimethylchlorosilane); alkoxysilanes (e.g., trimethylmethoxysilane, dimethyldiethoxysilane, methyldimethoxysilane, dimethylvinylethoxysilane, diphenyldimethoxysilane, phenyltriethoxysilane); silazanes (e.g., hexamethyldisilazane, N,N'-bis(trimethylsilyl) urea, dimethyltrimethylsilylamine, trimethylsilylimidazole); silanes (e.g., vinyl trichlorosilane, 3-chloropropyltrimethoxysilane, 3-aminopropyltrimethoxysilane, 3-methacryloxypropyltrimethoxysilane, 3-glycidoxypropyltrimethoxysilane, 3-(N-piperidinyl) propyltrimethoxysilane); heterocyclic compounds (e.g., benzotriazole, benzimidazole, indazole, imidazole, 2-mercapto-benzimidazole, 2-mercapto-benzothiazole, 2-mercapto-benzoxazole, urazole, thiourazole, thiouracil, mercaptoimidazole, mercaptopyrimidine); urea (e.g., 1,1-dimethylurca, 1,3-dimethylurca); or thiourea compounds. Among the adhesion promoters, one or two or more kinds thereof may be used in combination. The amount of these adhesion promoters added is usually 18 mass % or less, preferably from 0.0008 to 9 mass %, and more preferably from 0.04 to 9 mass % in the solid content.

The present invention may contain a sensitizer. Examples of the available sensitizer include anthracene, phenothiazine, perylene, thioxanthone, or benzophenone thioxanthone. Further, examples of the sensitizing dye include a thiopyrylium salt-based dye, a melocyanine dye, a quinoline-based dye, a styrylquinoline-based dye, a ketocoumarin-based dye, a thioxanthene-based dye, a xanthene-based dye, an oxonol-based dye, a cyanine-based dyes, a rhodamine-based dye, or a pyrylium salt-based dye. Particularly preferred is an anthracene-based sensitizer. Sensitivity is dramatically improved when the sensitizer is used in combination with a cationic curing catalyst (radiosensitive cationic polymerization initiator). The sensitizer also has a function of initiating radical polymerization. In the hybrid type, in which the cationic curing system and the radical curing system in the present invention are used together, the catalyst species can be simplified. Dibutoxyanthracene or dipropoxyanthraquinone, for example, is effective as a specific anthracene compound. The amount of sensitizer added is from 0.01 to 20 mass % and preferably from 0.01 to 10 mass % in the solid content.

The composition of the present invention may be photo- or thermo-cured using a photo-radical generator, thermal radical generator, photo acid generator, or thermal acid generator. In the case of using a photo acid generator or thermal acid generator, for example, any epoxy curing agent (e.g., an amine and/or an acid anhydride) that is normally used is not used, or even if used, the content is extremely low. Therefore, the storage stability of the composition of the present invention is improved.

The above composition is found to be applicable to photocationic polymerization. The curing rate is higher than that of conventional liquid epoxy compounds (e.g., alicyclic epoxy compounds with an epoxy cyclohexyl ring). The fast curing rate allows for a decrease in the amount of acid generator added and the use of a weak acid generator. The decrease of an acid generator is important to prevent metal corrosion because acid-active species may remain after UV irradiation. The fast curing rate enables thick film curing. Curing by UV irradiation can be applied to materials (equipment) that are sensitive to heat.

Thermosetting and photo-curing materials using the film-forming composition of the present invention are characterized by rapid hardening, transparency, and small curing shrinkage. Thus, they can be used for coating and bonding electronic components, optical components (antireflective coatings), and precision mechanical components.

The above composition (varnish) can be suitably used as hard coating agents or compositions for nanoimprinting.

In addition, other applications include cell phones, optical elements (e.g., camera lenses, light emitting diodes (LEDs), semiconductor lasers (LDs)), LCD panels, biochips, parts (e.g., camera lenses, prisms), magnetic components of hard disks in personal computers, pickup parts (a part that captures the optical information reflected from the disc) in CD and DVD players, speaker cones and coils, motor magnets, circuit boards, electronic components, or internal parts of engines of automobiles. The above composition (varnish) can be used for bonding thereof.

The above composition (varnish) may be for hard coatings to protect a surface of automobile bodies, lamps, electrical appliances, construction materials, plastics, and so on. This can be applied to, for example, automobile and motorcycle bodies, headlight lenses and mirrors, plastic lenses of glasses, cellular phones, game consoles, optical films, ID cards, and so on.

The above composition (varnish) may be for ink materials used for printing on metals (e.g., aluminum) or plastics. Examples of the application include printing inks for cards (e.g., credit cards, membership cards), switches and keyboards of electrical appliances and office automation equipment, or inkjet printer inks for CDs, DVDs, and other products.

Examples include technologies to create complex three-dimensional objects by curing resin in combination with 3D CAD, applications to optical modeling (e.g., model manufacturing of an industrial product), or applications to optical fiber coating, bonding, optical waveguide, thick film resist, and so on.

In addition, the film-forming composition of the present invention can be suitably used as electronic component-use insulating resins (e.g., anti-reflective films, semiconductor encapsulating materials, electronic material-use adhesives, printed circuit board materials, interlayer insulating film materials, power module-use sealants) or insulating resins used in high-voltage equipment (e.g., power generator coils, transformer coils, gas-insulated check devices).

EXAMPLES

[Total Metal Oxide Concentration]

The sol was weighed using a crucible and pre-dried by heating at 110° C. for 30 minutes to remove the solvent. This crucible was fired at 600° C. for 30 minutes. The crucible was weighed and the total metal oxide concentration was calculated from the weight of the residue.

[X-Ray Diffraction Measurement]

The sol was dried on a hot plate at 110° C. and ground for 15 minutes while using a mortar and pestle to obtain dry powder. The dry powder was measured with XRD equipment (trade name MiniFlex 600, manufactured by Rigaku) to obtain an X-ray diffraction pattern.

[Viscosity]

The viscosity was measured with a BM-type viscometer (at 25° C.).

[Average Particle Diameter by Dynamic Light Scattering (Dynamic Light Scattering Particle Diameter; DLS Average Secondary Particle Diameter)]

The sol was diluted with a dispersing solvent and measured with a dynamic light scattering instrument (trade name: Zetasizer, manufactured by Malvern Instruments Ltd.) using the parameters of the solvent.

[Average Primary Particle Diameter by Transmission Electron Microscopy]

The sol was added dropwise onto a copper mesh, dried, and observed using a transmission electron microscope (trade name JEM-1020, manufactured by JEOL Ltd.) at an acceleration voltage of 100 kV. Then, 100 particles were measured and averaged to determine the average primary particle diameter.

[$^{31}$P-NMR Test]

The $^{31}$P-NMR of colloidal particles in the sol was measured by the following procedure.

(Preparing Phosphoric Acid-Treated Colloidal Particle Dry Powder)

The surface of the colloidal particles was phosphoric acid-treated by adding, to 10.0 g of the sol, 85% aqueous phosphoric acid solution at 3.0 mass % based on the solid content of the colloidal particles and stirring the solution for 0.5 hours. The resulting sol was then thoroughly washed by ultrafiltration to remove any phosphoric acid not bound to the particles. The washed sol was dried on a hot plate at 60° C. for 3 hours, and the dried powder was ground in an agate mortar for 10 minutes to prepare phosphoric acid-treated colloidal particle dry powder.

($^{31}$P-NMR Analysis by Solid NMR)

The dry powder was sealed in a sample tube (2.5 mm in diameter) used for solid NMR measurement, and $^{31}$P solid NMR measurements were performed using the DD/MAS method. The nuclear magnetic resonance spectrometer AVANCE3 (trade name) (500 MHZ; manufactured by Bruker) was used for the measurements under the following conditions.

Probe diameter: 4.0 mm

Rotation speed: 30000 Hz

Relaxation waiting time: 10 s

Number of integrations: 8000 times

From the obtained spectra, the peaks are divided into peaks derived from the metal species to which the phosphoric acid is bonded. The presence or absence of the main peak (Ti—O—P) derived from Ti atoms, the core component of the colloidal particles, was then examined.

$$\text{Residual color rate (\%)} = A1/A0 \times 100.$$

The particles with a Ti—O—P peak are designated as "○" and those without any Ti—O—P peaks are designated as "x".

[Residual Color Rate of Dye after UV Irradiation at 490 nm]

To a water or methanol dispersion of inorganic oxide microparticles in an amount equivalent to 0.05 g in solid content by weight was added a suitable solvent so that water/methanol=1/1 (weight ratio) and the solid content concentration was 0.5 wt %. Next, a sample was prepared by mixing the obtained dispersion with a glycerin solution containing a sunset yellow dye with a solid content of 0.02 wt %, so that the weight ratio (dispersion weight/glycerin solution weight) was ⅓. This was placed in a quartz cell, which was 1 mm deep, 1 cm wide, and 5 cm high. Next, a UV lamp (ASONE-made SLUV-6) with a selected wavelength range of I-line (wavelength: 365 nm) was used to irradiate a 1 cm wide×5 cm high surface of the above quartz cell with UV light at an intensity of 0.4 mW/cm$^2$ (in terms of intensity at a wavelength of 365 nm) at 25° C. for 30 minutes. Absorbance (A0) of the sample before UV irradiation at a wavelength of 490 nm and absorbance (A1) after the UV irradiation were measured with a UV-visible-near-infrared spectrophotometer (trade name UV-3600, manufactured by Shimadzu Corporation). The residual color rate of the dye was calculated from the following formula:

$$\text{Ti–O–P: } \delta = 3 \text{ to } 5\ ppm$$

[Particle Refractive Index]

The refractive index of colloidal particles in the sol was measured by the following procedures i) to iii).

i) Preparing Coating Solution Blended with Colloidal Particle Organic Solvent-Dispersed Sol First, 20.00 g of 3-glycidoxypropyltrimethoxysilane (trade name: SILQUEST A-187T, manufactured by Momentive) was weighed in a polyethylene container, 18.57 g of methanol and 4.57 g of a 0.01 N hydrochloric acid solution were added thereto, and the mixture was stirred at room temperature for 5 hours. Next, 6.00 g of a previously prepared methanol solution containing aluminum 2,4-pentanedioic acid (Al(acac)$_3$) (10 mass % Al(acac)$_3$) was added as a curing agent, and the mixture was stirred for 10 minutes to prepare a partial hydrolysate of 3-glycidoxypropyltrimethoxysilane (concentration: 43 mass %).

Then, 0.25 g of methanol solution (10 mass % L-7604) containing the prepared partial hydrolysate of 3-glycidoxypropyltrimethoxysilane, colloidal particle-dispersed sol, water, methanol, and a leveling agent (DOWSIL trade name: L-7604) was weighed into a brown bottle and the mixture was stirred at room temperature for 30 minutes, so that the total amount was 25.00 g and the final solvent composition had a weight ratio of water/total solvent other than water of ¼ and the amount of colloidal particles blended in the organic solvent-dispersed sol was 50 phr, 100 phr, or 150 phr. In this way, the coating solution blended with the colloidal particle organic solvent-dispersed sol (solid content: 10.0 mass %; the amount of colloidal particles: 50 phr, 100 phr, or 150 phr) was prepared.

ii) Preparing Particle-Blended Film

About 0.5 mL of the coating solution blended with the colloidal particle organic solvent-dispersed sol obtained in i) was added dropwise onto a UV-$O_3$-treated Si substrate, and a spin coater (trade name: Opticoat MS-B100; MIKASA CO., LTD.) was used for coating at a post-coating film thickness of 1.0 μm. The particle-blended film (the amount of particles blended: 50 phr, 100 phr, or 150 phr) was then prepared by baking on a hot plate at 80° C. for 5 minutes and heat-treating in an oven at 120° C. for 1 hour.

iii) Measuring Refractive Index of Particle-Blended Film and Calculating Refractive Index of Particles The refractive index of each particle-blended film (the amount of particles blended: 50 phr, 100 phr, or 150 phr) obtained in ii) was measured with an ellipsometer (multiple-incidence angle spectroscopic ellipsometer, trade name VASE, manufactured by J.A. Woollam Japan Co., Ltd.). In addition, the refractive index of a particle-free film prepared in the same way using the partial hydrolysate of 3-glycidoxypropyltrimethoxysilane alone was also measured. The refractive indices of the measured blended films were plotted against the amount of particles blended, and the particle refractive indices were obtained by extrapolation such that the amount of particles blended was 100 mass %.

[Dispersion Stability]

Each dispersion was subjected to a storage test at 50° C. for 1 week. Then, samples, the dynamic light scattering particle diameter of which was less than 1.2 times that before the storage test were designated "○" as unchanged, and samples, the dynamic light scattering particle diameter of which was 1.2 times or larger than that before the storage test were designated "x".

Each cured film was deposited on a urethane-based plastic lens substrate or a glass substrate by the method described in (Example 9: Cured film evaluation-A1) or (Example 13: Cured film evaluation-A5), for example, and evaluated at 25° C. and 50% humidity.

(1) Film Refractive Index

The reflectivity of each cured film formed on a glass substrate was measured using a reflectivity meter (trade name: USPM-RU, manufactured by Olympus Corporation). The measured reflectivity was used to calculate the refractive index of the cured film by using optical simulation.

(2) Transparency

Under fluorescent light in a dark room, the presence or absence of fogging of the cured film formed on a urethane-based plastic lens substrate or a glass substrate was examined visually. The criteria are as follows.

○: Almost no fogging x: Fogging occurs and whitening is evident.

(3) Light Resistance

A UV fluorescent lamp accelerated weathering tester (trade name: QUV, manufactured by Q-Lab) equipped with a UV-A lamp was used to irradiate a cured film formed on a urethane-based plastic lens or glass substrate with UV light for 24 hours under conditions at 0.89 $W/m^2$ (340 nm). The criteria are as follows.

○: No cracks and/or film detachment is observed.

x: Cracks and/or film detachment is observed.

(4) Scratch Resistance

Steel wool #0000 was used to scratch a surface of the cured film formed on the urethane-based plastic lens substrate or glass substrate. The presence or absence of scratch on the cured film was visually examined in a bright room and under fluorescent light. Note that the scratch resistance test conditions were set at 1 cycle/10 seconds under a 1-kg load. The criteria are as follows.

○: No scratches are visually found at all.

x: Scratches are visually found.

(5) Nanoimprintability

The coating solution blended with the colloidal particle organic solvent-dispersed sol was spin-coated on a quartz substrate and heated on a hot plate at 100° C. for 1 minute to produce a desolvated film. The obtained film was irradiated with UV light by using a nanoimprinter (trade name: NM-0801HB, manufactured by MEISYO KIKO) with a release-treated quartz mold (trade name: DTM-2-1, manufactured by KYODO INTERNATIONAL, INC.) while being pressed on at 1000 N. The film was cured while transferring an uneven pattern. The mold was detached from the obtained cured film, and the pattern formed was observed by SEM (trade name JSM-6010LV, JEOL Ltd.). The criteria are as follows.

○: Pattern is transferred, indicating good imprintability.

x: Pattern is not transferred, indicating poor imprintability.

(Reference Example 1): Preparing Titanium Dioxide-Tin Dioxide Composite Oxide Colloidal Particles (A1) as Core First, 319.5 g of 25 mass % tetramethylammonium hydroxide solution was dissolved in 947.1 g of pure water, and 7.4 g of meta-stannic acid (containing 6.3 g in terms of $SnO_2$), 236.6 g of titanium tetraisopropoxide (containing 66.6 g in terms of $TiO_2$), and 82.0 g of oxalic acid dihydrate (58.5 g in terms of oxalic acid) were added under stirring. The mixed solution was kept at 80° C. for 2 hours, and the pressure was reduced to 580 Torr for another 2 hours to prepare a mixed solution. The above mixed solution was placed in a glass-lined autoclave vessel, hydrothermally treated at 140° C. for 5 hours, cooled to room temperature, and then taken out. The obtained sol was a water-dispersed sol containing titanium dioxide-tin dioxide composite oxide colloidal particles (A1), and had a total metal oxide concentration ($TiO_2$ and $SnO_2$) of 5.0 mass % and an average primary particle diameter of 10 nm as observed by transmission electron microscopy. The powder obtained by drying this sol at 110° C. was analyzed by X-ray diffractometry and was found to be a rutile-type crystal.

(Reference Example 2): Preparing Titanium Dioxide-Tin Dioxide Composite Oxide Colloidal Particles (A2) as Core First, 319.5 g of 25 mass % tetramethylammonium hydroxide solution was dissolved in 947.1 g of pure water, and 14.8 g of meta-stannic acid (containing 12.5 g in terms of $SnO_2$), 236.6 g of titanium tetraisopropoxide (containing 66.6 g in terms of $TiO_2$), and 82.0 g of oxalic acid dihydrate (58.5 g in terms of oxalic acid) were added under stirring. The mixed solution was kept at 80° C. for 2 hours, and the pressure was reduced to 580 Torr for another 2 hours to prepare a mixed solution. The above mixed solution was placed in a glass-lined autoclave vessel, hydrothermally treated at 140° C. for 5 hours, cooled to room temperature, and then taken out. The obtained sol was a water-dispersed sol containing titanium dioxide-tin dioxide composite oxide colloidal particles (A2), and had a total metal oxide concentration ($TiO_2$ and $SnO_2$) of 5.0 mass % and an average primary particle diameter of 10 nm as observed by transmission electron microscopy. The powder obtained by drying the resulting sol at 110° C. was analyzed by X-ray diffractometry and was found to be a rutile-type crystal.

(Reference Example 3): Preparing Titanium Dioxide Colloidal Particles (A3) as Core First, 319.5 g of 25 mass % tetramethylammonium hydroxide solution was dissolved in 947.1 g of pure water, and 236.6 g of titanium tetraisopropoxide (containing 66.6 g in terms of $TiO_2$) and 82.0 g of oxalic acid dihydrate (58.5 g in terms of oxalic acid) were added under stirring. The mixed solution was kept at 80° C. for 2 hours, and the pressure was reduced to 580 Torr for another 2 hours to prepare a mixed solution. The above mixed solution was placed in a glass-lined autoclave vessel, hydrothermally treated at 140° C. for 5 hours, cooled to room temperature, and then taken out. The obtained sol was a water-dispersed sol containing titanium dioxide colloidal particles (A3), and had a total metal oxide concentration ($TiO_2$) of 5.0 mass % and an average primary particle diameter of 10 nm as observed by transmission electron microscopy. The powder obtained by drying the resulting sol at 110° C. was analyzed by X-ray diffractometry and was found to be an anatase-type crystal.

(Reference Example 4): Preparing Silicon Dioxide-Tin Dioxide Composite Oxide Colloidal Particles (B1) as a Coating Material First, 77.2 g of JIS No. 3 sodium silicate (containing 29.8 mass % in terms of $SiO_2$) was dissolved in 668.8 g of pure water, and 20.9 g of sodium stannate $NaSnO_3 \cdot H_2O$ (containing 55.1 mass % in terms of $SnO_2$) was dissolved therein. The resulting aqueous solution was passed through a column packed with a hydrogen-type cation exchange resin (AMBERLITE (trade name) IR-120B). Subsequently, 7.2 g of diisopropylamine was added to the resulting water-dispersed sol. The obtained sol was a water-dispersed sol containing alkaline silicon dioxide-tin dioxide composite oxide colloidal particles (B1), and had a pH of 8.0, a total metal oxide concentration ($SiO_2$ and $SnO_2$) of 1.7 mass %, and an average primary particle diameter of 3 nm as observed by transmission electron microscopy.

(Reference Example 5): Preparing Antimony Pentoxide Colloidal Particles (B2) as a Coating Material First, 125 g of antimony trioxide (containing 99.5 mass % as $Sb_2O_3$), 660 g of pure water, and 125 g of potassium hydroxide (containing 95 mass % as KOH) were added to a 3-L vessel, and 84 g of 35% hydrogen peroxide was gradually added under stirring. The resulting aqueous solution of potassium antimonate was diluted to 2.2 mass % and passed through a column packed with a hydrogen-type cation exchange resin. To the ion-exchanged antimonic acid solution was added 2.5 g of diisopropylamine under stirring. The obtained sol was a water-dispersed sol containing antimony pentoxide colloidal particles (B2), and had a pH of 10.8, a $Sb_2O_5$ concentration of 1.5 mass %, and an average primary particle diameter of 6 nm as observed by transmission electron microscopy.

(Production Example 1): Preparing Titanium Dioxide-Tin Dioxide Composite Oxide Colloidal Particles (C1) Modified with Silicon Dioxide-Tin Dioxide Composite Oxide First, 1500.0 g of water-dispersed sol containing titanium dioxide-tin dioxide composite oxide colloidal particles (A1) prepared in Reference Example 1 was added under stirring to 661.8 g of water-dispersed sol containing alkaline silicon dioxide-tin dioxide composite oxide colloidal particles (B1) prepared in Reference Example 4. After heated at 95° C. for 3 hours, the resulting mixture was passed through a column packed with a cation exchange resin (AMBERLITE (trade name) IR-120B, manufactured by ORGANO CORPORATION).

With respect to 100 parts by mass of the solid content of the coating sol filled in a container, the solid content of the core sol added to the container was 667 parts by mass, and was added at a rate of 66.7 parts by mass per minute for 10 minutes.

To the resulting water-dispersed sol was added 2.5 g of tri-n-pentylamine, and the mixture was concentrated by ultrafiltration method to produce a water-dispersed sol containing titanium dioxide-tin dioxide composite oxide colloidal particles ($C_1$) modified with silicon dioxide-tin dioxide composite oxide. This water-dispersed sol had a pH of 5.2, a total metal oxide ($TiO_2$, $SnO_2$, and $SiO_2$) concentration of 30.5 mass %, a viscosity of 5.0 mPa·s, and a DLS average secondary particle diameter of 15 nm.

(Production Example 2): Preparing Titanium Dioxide-Tin Dioxide Composite Oxide Colloidal Particles (C2) Modified with Silicon Dioxide-Tin Dioxide Composite Oxide First, 1500.0 g of water-dispersed sol containing titanium dioxide-tin dioxide composite oxide colloidal particles (A1) prepared in Reference Example 1 was added under stirring to 330.9 g of water-dispersed sol containing alkaline silicon dioxide-tin dioxide composite oxide colloidal particles (B1) prepared in Reference Example 4. After heated at 95° C. for 3 hours, the resulting mixture was passed through a column packed with a cation exchange resin (AMBERLITE (trade name) IR-120B, manufactured by ORGANO CORPORATION).

With respect to 100 parts by mass of the solid content of the coating sol filled in a container, the solid content of the core sol added to the container was 1340 parts by mass, and was added at a rate of 67 parts by mass per minute for 20 minutes.

To the resulting water-dispersed sol was added 2.0 g of tri-n-pentylamine, and the mixture was concentrated by ultrafiltration method to produce a water-dispersed sol containing titanium dioxide-tin dioxide composite oxide colloidal particles (C2) modified with silicon dioxide-tin dioxide composite oxide. This water-dispersed sol had a pH of 5.2, a total metal oxide ($TiO_2$, $SnO_2$, and $SiO_2$) concentration of 30.5 mass %, a viscosity of 6.0 mPa-s, and a DLS average secondary particle diameter of 18 nm.

(Production Example 3): Preparing Titanium Dioxide-Tin Dioxide-Zirconium Oxide Composite Oxide Colloidal Particles (C3) Modified with Silicon Dioxide-Tin Dioxide Composite Oxide First, 583.8 g of aqueous zirconium oxychloride solution (containing 3.0 mass % in terms of $ZrO_2$) was prepared by diluting 82.7 g of zirconium oxychloride (containing 21.2 mass % in terms of $ZrO_2$) with 501.1 g of pure water. Next, 1750.0 g of water-dispersed sol containing titanium dioxide-tin dioxide composite oxide colloidal particles (A2) prepared in Reference Example 2 was added under stirring. Hydrolysis was then carried out by heating at 95° C. for 5 hours to obtain a water-dispersed sol containing titanium dioxide-tin dioxide-zirconium oxide composite oxide colloidal particles with a thin layer of zirconium oxide formed on the surface.

To 2330.0 g of the resulting water-dispersed sol was added, under stirring, 1852.9 g of the water-dispersed sol containing alkaline silicon dioxide-tin dioxide composite oxide colloidal particles (B1) prepared in Reference Example 4. The mixture was passed through a column packed with 500 ml of an anion exchange resin (AMBERLITE (trade name) IRA-410, manufactured by ORGANO CORPORATION). Next, the passed-through water-dispersed sol was heated at 95° C. for 5 hours and passed through a column packed with a cation exchange resin (AMBERLITE (trade name) IR-120B, manufactured by ORGANO CORPORATION).

With respect to 100 parts by mass of the solid content of the core sol filled in a container, the solid content of the coating sol added to the container was 30 parts by mass, and was added at a rate of 30 parts by mass per minute for 1 minute.

To the resulting water-dispersed sol was added 3.5 g of tri-n-pentylamine, and the mixture was concentrated by ultrafiltration method to produce a water-dispersed sol containing titanium dioxide-tin dioxide-zirconium oxide composite oxide colloidal particles (C3) modified with silicon dioxide-tin dioxide composite oxide. This water-dispersed sol had a pH of 5.2, a total metal oxide ($TiO_2$, $ZrO_2$, $SnO_2$, and $SiO_2$) concentration of 30.5 mass %, a viscosity of 5.0 mPa·s, and a DLS average secondary particle diameter of 20 nm.

(Production Example 4): Preparing Titanium Dioxide-Tin Dioxide-Zirconium Oxide Composite Oxide Colloidal Particles (C4) Modified with Silicon Dioxide-Tin Dioxide Composite Oxide First, 583.8 g of aqueous zirconium oxychloride solution (containing 3.0 mass % in terms of $ZrO_2$) was prepared by diluting 82.7 g of zirconium oxychloride (containing 21.2 mass % in terms of $ZrO_2$) with 501.1 g of pure water. Next, 1750.0 g of water-dispersed sol containing titanium dioxide-tin dioxide composite oxide colloidal particles (A1) prepared in Reference Example 1 was added under stirring. Hydrolysis was then carried out by heating to 95° C. to obtain a water-dispersed sol containing titanium dioxide-tin dioxide-zirconium oxide composite oxide colloidal particles with a thin layer of zirconium oxide formed on the surface.

To 2330.0 g of the resulting water-dispersed sol was added, under stirring, 2470.6 g of the water-dispersed sol containing alkaline silicon dioxide-tin dioxide composite oxide colloidal particles (B1) prepared in Reference Example 4. The mixture was passed through a column packed with 500 ml of an anion exchange resin (AMBERLITE (trade name) IRA-410, manufactured by ORGANO CORPORATION). Next, the passed-through water-dispersed sol was heated at 95° C. for 5 hours and passed through a column packed with a cation exchange resin.

With respect to 100 parts by mass of the solid content of the core sol filled in a container, the solid content of the coating sol added to the container was 40 parts by mass, and was added at a rate of 40 parts by mass per minute for 1 minute.

To the resulting water-dispersed sol was added 5.6 g of tri-n-pentylamine, and the mixture was concentrated by ultrafiltration method to produce a water-dispersed sol containing titanium dioxide-tin dioxide-zirconium oxide composite oxide colloidal particles (C4) modified with silicon dioxide-tin dioxide composite oxide. This water-dispersed sol had a pH of 5.1, a total metal oxide ($TiO_2$, $ZrO_2$, $SnO_2$, and $SiO_2$) concentration of 30.5 mass %, a viscosity of 5.0 mPa·s, and a DLS average secondary particle diameter of 25 nm.

(Production Example 5): Preparing Titanium Dioxide-Tin Dioxide-Zirconium Oxide Composite Oxide Colloidal Particles (C5) Modified with Silicon Dioxide-Tin Dioxide Composite Oxide First, 583.8 g of aqueous zirconium oxychloride solution (containing 3.0 mass % in terms of $ZrO_2$) was prepared by diluting 82.7 g of zirconium oxychloride (containing 21.2 mass % in terms of $ZrO_2$) with 501.1 g of pure water. Next, 1750.0 g of water-dispersed sol containing titanium dioxide-tin dioxide composite oxide colloidal particles (A1) prepared in Reference Example 1 was added under stirring. Hydrolysis was then carried out by heating to 95° C. to obtain a water-dispersed sol containing titanium dioxide-tin dioxide-zirconium oxide composite oxide colloidal particles with a thin layer of zirconium oxide formed on the surface.

To 2330.0 g of the resulting water-dispersed sol was added, under stirring, 3088.2 g of the water-dispersed sol containing alkaline silicon dioxide-tin dioxide composite oxide colloidal particles (B1) prepared in Reference Example 4. The mixture was passed through a column packed with 500 ml of an anion exchange resin (AMBERLITE (trade name) IRA-410, manufactured by ORGANO CORPORATION). Next, the passed-through water-dispersed sol was heated at 95° C. for 5 hours and passed through a column packed with a cation exchange resin.

With respect to 100 parts by mass of the solid content of the core sol filled in a container, the solid content of the coating sol added to the container was 50 parts by mass, and was added at a rate of 25 parts by mass per minute for 2 minutes.

To the resulting water-dispersed sol was added 6.2 g of tri-n-pentylamine, and the mixture was concentrated by ultrafiltration method to produce a water-dispersed sol containing titanium dioxide-tin dioxide-zirconium oxide composite oxide colloidal particles ($C_4$) modified with silicon dioxide-tin dioxide composite oxide. This water-dispersed sol had a pH of 5.0, a total metal oxide ($TiO_2$, $ZrO_2$, $SnO_2$, and $SiO_2$) concentration of 30.5 mass %, a viscosity of 5.4 mPa·s, and a DLS average secondary particle diameter of 24 nm.

(Production Example 6): Preparing Titanium Dioxide-Tin Dioxide Composite Oxide Colloidal Particles (C6) Modified with Antimony Pentoxide Colloidal Particles First, 1500.0 g of water-dispersed sol containing titanium dioxide-tin dioxide composite oxide colloidal particles (A1) prepared in Reference Example 1 was added under stirring to 1500.0 g of water-dispersed sol containing alkaline antimony pentoxide colloidal particles (B2) prepared in Reference Example 5. After heated at 95° C. for 3 hours, the resulting mixture was passed through a column packed with a cation exchange resin.

With respect to 100 parts by mass of the solid content of the coating sol filled in a container, the solid content of the core sol added to the container was 333 parts by mass, and was added at a rate of 33.3 parts by mass per minute for 10 minutes.

To the resulting water-dispersed sol was added 1.8 g of diisobutylamine, and the mixture was concentrated by ultrafiltration method to produce a water-dispersed sol containing titanium dioxide-tin dioxide composite oxide colloidal particles (C6) modified with antimony pentoxide colloidal particles. This water-dispersed sol had a pH of 5.6, a total metal oxide ($TiO_2$, $SnO_2$, and $Sb_2O_5$) concentration of 30.5 mass %, a viscosity of 5.5 mPa·s, and a DLS average secondary particle diameter of 18 nm.

(Production Example 7): Preparing Anatase-Type Titanium Dioxide Colloidal Particles (C7) Modified with Silicon Dioxide-Tin Dioxide Composite Oxide First, 1500.0 g of water-dispersed sol containing anatase-type titanium dioxide colloidal particles (A3) prepared in Reference Example 3 was added under stirring to 1764.7 g of water-dispersed sol containing alkaline silicon dioxide-tin dioxide composite oxide colloidal particles (B1) prepared in Reference Example 4. After heated at 95° C. for 3 hours, the resulting mixture was passed through a column packed with a cation exchange resin.

With respect to 100 parts by mass of the solid content of the coating sol filled in a container, the solid content of the core sol added to the container was 250 parts by mass, and was added at a rate of 25.0 parts by mass per minute for 10 minutes.

To the resulting water-dispersed sol was added 4.5 g of diisobutylamine, and the mixture was concentrated by ultrafiltration method to produce a water-dispersed sol containing anatase-type titanium dioxide colloidal particles (C7) modified with silicon dioxide-tin dioxide composite oxide. This water-dispersed sol had a pH of 5.2, a total metal oxide ($TiO_2$, $SnO_2$, and $SiO_2$) concentration of 30.5 mass %, a viscosity of 6.5 mPa·s, and a DLS average secondary particle diameter of 28 nm.

(Production Example 8): Preparing Titanium Dioxide-Tin Dioxide Composite Oxide Colloidal Particles (C8) with the Core Surface Modified with Polyoxyethylene Alkyl Ether Phosphate To 1500.0 g of water-dispersed sol containing titanium dioxide-tin dioxide composite oxide colloidal particles (A1) prepared in Reference Example 1 was added, under stirring, 15.0 g of polyoxyethylene alkyl ether phosphate (RS-710, manufactured by TOHO Chemical Industry Co., Ltd.) as a surface modifier, so that the surface of the particles was modified.

The resulting sol was concentrated by ultrafiltration method to obtain a water-dispersed sol containing titanium dioxide-tin dioxide composite oxide colloidal particles (C8) with the core surface modified with polyoxyethylene alkyl ether phosphate. This water-dispersed sol had a pH of 2.8, a total metal oxide ($TiO_2$ and $SnO_2$) concentration of 30.0 mass %, a viscosity of 6.5 mPa·s, and a DLS average secondary particle diameter of 26 nm.

(Production Example 9): Preparing Titanium Dioxide-Tin Dioxide Composite Oxide Colloidal Particles (C9) Modified with Silicon Dioxide-Tin Dioxide Composite Oxide First, 1500.0 g of water-dispersed sol containing titanium dioxide-tin dioxide composite oxide colloidal particles (A1) prepared in Reference Example 1 was added under stirring to 4411.8 g of water-dispersed sol containing alkaline silicon dioxide-tin dioxide composite oxide colloidal particles (B1) prepared in Reference Example 4. After heated at 95° C. for 3 hours, the resulting mixture was passed through a column packed with a cation exchange resin (AMBERLITE (trade name) IR-120B, manufactured by ORGANO CORPORATION).

With respect to 100 parts by mass of the solid content of the coating sol filled in a container, the solid content of the core sol added to the container was 100 parts by mass, and was added at a rate of 10 parts by mass per minute for 10 minutes.

To the resulting water-dispersed sol was added 3.1 g of tri-n-pentylamine, and the mixture was concentrated by ultrafiltration method to produce a water-dispersed sol containing titanium dioxide-tin dioxide composite oxide colloidal particles (C1) modified with silicon dioxide-tin dioxide composite oxide. This water-dispersed sol had a pH of 5.2, a total metal oxide ($TiO_2$, $SnO_2$, and $SiO_2$) concentration of 30.5 mass %, a viscosity of 5.0 mPa·s, and a DLS average secondary particle diameter of 20 nm.

(Production Example 10): Preparing Titanium Dioxide-Tin Dioxide-Zirconium Oxide Composite Oxide Colloidal Particles (C10) Modified with Silicon Dioxide-Tin Dioxide Composite Oxide First, 583.8 g of aqueous zirconium oxychloride solution (containing 3.0 mass % in terms of $ZrO_2$) was prepared by diluting 82.7 g of zirconium oxychloride (containing 21.2 mass % in terms of $ZrO_2$) with 501.1 g of pure water. Next, 1750.0 g of water-dispersed sol containing titanium dioxide-tin dioxide composite oxide colloidal particles (A1) prepared in Reference Example 1 was added under stirring. Hydrolysis was then carried out by heating to 95° C. to obtain a water-dispersed sol containing titanium dioxide-tin dioxide-zirconium oxide composite oxide colloidal particles with a thin layer of zirconium oxide formed on the surface.

To 2330.0 g of the resulting water-dispersed sol was added, under stirring, 6176.4 g of the water-dispersed sol containing alkaline silicon dioxide-tin dioxide composite oxide colloidal particles (B1) prepared in Reference Example 4. The mixture was passed through a column packed with 500 ml of an anion exchange resin (AMBERLITE (trade name) IRA-410, manufactured by ORGANO CORPORATION). Next, the passed-through water-dispersed sol was heated at 95° C. for 5 hours and passed through a column packed with a cation exchange resin.

With respect to 100 parts by mass of the solid content of the core sol filled in a container, the solid content of the coating sol added to the container was 100 parts by mass, and was added at a rate of 20 parts by mass per minute for 5 minutes.

To the resulting water-dispersed sol was added 10.2 g of tri-n-pentylamine, and the mixture was concentrated by ultrafiltration method to produce a water-dispersed sol containing titanium dioxide-tin dioxide-zirconium oxide composite oxide colloidal particles (C10) modified with silicon dioxide-tin dioxide composite oxide. This water-dispersed sol had a pH of 5.4, a total metal oxide ($TiO_2$, $ZrO_2$, $SnO_2$, and $SiO_2$) concentration of 30.5 mass %, a viscosity of 5.8 mPa·s, and a DLS average secondary particle diameter of 21 nm.

Example 1

In 100 g of water-dispersed sol containing titanium dioxide-tin dioxide composite oxide colloidal particles (C1) modified with silicon dioxide-tin dioxide composite oxide as obtained in Production Example 1, the dispersing medium was replaced with methanol by using a rotary evaporator to prepare titanium dioxide-tin dioxide composite oxide colloidal particles (C1) modified with silicon dioxide-tin dioxide composite oxide. To 100 g of the resulting sol was added, under stirring, 1.52 g of polyoxyethylene alkyl ether phosphate (trade name: RS-710, manufactured by TOHO Chemical Industry Co., Ltd.) as a surface modifier, and the mixture was heated under reflux at 65° C. for 5 hours, so that the surface of the particles was modified. This surface-modified, methanol-dispersed sol had a pH of 4.5, a total metal oxide ($TiO_2$, $SnO_2$, and $SiO_2$) concentration of 20.5 mass %, a viscosity of 2.3 mPa·s, and a DLS average secondary particle diameter of 16 nm. Here, the P—O—Ti "bond was present" according to $^{31}P$-NMR, the residual color rate was 54%, the mass ratio of (metal oxide other than titanium oxide)/(titanium dioxide) was 0.26, the particle refractive index was 2.25, and the dispersion stability was "○".

FIG. 1 is a $^{31}$P-NMR spectrum of the titanium dioxide-tin dioxide composite oxide colloidal particles (C1) modified with silicon dioxide-tin dioxide composite oxide as used in Example 1. The shell layer covering the core is missing in some areas, leaving the core exposed. When the core-shell type modified metal oxide particles were in contact with an aqueous phosphoric acid solution, a peak around δ=3 to 5 ppm was observed, which peak is derived from the (Ti—O—P) bond, via an oxygen atom, between the Ti atom on the core and the P atom in the phosphoric acid in the shell layer. Thus, the (Ti—O—P) "bond was present". That is, in the core-shell type metal oxide particles, a part of the shell layer covering the core was missing and some areas of the core were exposed.

Example 2

A sol was prepared in the same manner as in Example 1, except that the colloidal particles in Example 1 were changed to (C2) obtained in Production Example 2. At this time, the methanol-dispersed sol had a pH of 4.2, a total metal oxide ($TiO_2$, $SnO_2$, and $SiO_2$) concentration of 30.5 mass %, a viscosity of 4.5 mPa·s, and a DLS average secondary particle diameter of 45 nm. Here, the P—O—Ti "bond was present" according to $^{31}$P-NMR, the residual color rate was 22%, the mass ratio of (metal oxide other than titanium oxide)/(titanium dioxide) was 0.18, the particle refractive index was 2.30, and the dispersion stability was "○".

Example 3

A sol was prepared in the same manner as in Example 1, except that the colloidal particles in Example 1 were changed to (C3) obtained in Production Example 3. At this time, the methanol-dispersed sol had a pH of 4.5, a total metal oxide ($TiO_2$, $ZrO_2$, $SnO_2$, and $SiO_2$) concentration of 30.5 mass %, a viscosity of 4.5 mPa·s, and a DLS average secondary particle diameter of 28 nm. Here, the P—O—Ti "bond was present" according to $^{31}$P-NMR, the residual color rate was 88%, the mass ratio of (metal oxide other than titanium oxide)/(titanium dioxide) was 0.85, the particle refractive index was 2.10, and the dispersion stability was "○".

Example 4

A sol was prepared in the same manner as in Example 1, except that the colloidal particles in Example 1 were changed to (C4) obtained in Production Example 4. At this time, the methanol-dispersed sol had a pH of 4.6, a total metal oxide ($TiO_2$, $ZrO_2$, $SnO_2$, and $SiO_2$) concentration of 30.5 mass %, a viscosity of 4.5 mPa·s, and a DLS average secondary particle diameter of 21 nm. Here, the P—O—Ti "bond was present" according to $^{31}$P-NMR, the residual color rate was 98%, the mass ratio of (metal oxide other than titanium oxide)/(titanium dioxide) was 0.83, the particle refractive index was 2.10, and the dispersion stability was "○".

Example 5

A sol was prepared in the same manner as in Example 1, except that the colloidal particles in Example 1 were changed to (C5) obtained in Production Example 5. At this time, the methanol-dispersed sol had a pH of 4.4, a total metal oxide ($TiO_2$, $ZrO_2$, $SnO_2$, and $SiO_2$) concentration of 30.5 mass %, a viscosity of 4.5 mPa·s, and a DLS average secondary particle diameter of 29 nm. Here, the P—O—Ti "bond was present" according to $^{31}$P-NMR, the residual color rate was 98%, the mass ratio of (metal oxide other than titanium oxide)/(titanium dioxide) was 0.97, the particle refractive index was 2.00, and the dispersion stability was "○".

Example 6

A sol was prepared in the same manner as in Example 1, except that the colloidal particles in Example 1 were changed to (C6) obtained in Production Example 6. At this time, the methanol-dispersed sol had a pH of 4.0, a total metal oxide ($TiO_2$, $SnO_2$, and $Sb_2O_5$) concentration of 20.5 mass %, a viscosity of 2.5 mPa·s, and a DLS average secondary particle diameter of 20 nm. Here, the P—O—Ti "bond was present" according to $^{31}$P-NMR, the residual color rate was 10%, the mass ratio of (metal oxide other than titanium oxide)/(titanium dioxide) was 0.42, the particle refractive index was 2.25, and the dispersion stability was "○".

Example 7

A sol was prepared in the same manner as in Example 1, except that the colloidal particles in Example 1 were changed to (C7) obtained in Production Example 7. At this time, the methanol-dispersed sol had a pH of 4.2, a total metal oxide ($TiO_2$, $SnO_2$, and $SiO_2$) concentration of 20.5 mass %, a viscosity of 2.3 mPa·s, and a DLS average secondary particle diameter of 29 nm.

Here, the P—O—Ti "bond was present" according to $^{31}$P-NMR, the residual color rate was 40%, the mass ratio of (metal oxide other than titanium oxide)/(titanium dioxide) was 0.40, the particle refractive index was 2.20, and the dispersion stability was "○".

Example 8

A sol was prepared in the same manner as in Example 1, except that the surface modifier in Example 1 was changed to 2.0 g of phenyltrimethoxysilane (trade name: KBM-103, manufactured by Shin-Etsu Chemical Co., Ltd.). At this time, the methanol-dispersed sol had a pH of 5.9, a total metal oxide ($TiO_2$, $SnO_2$, and $SiO_2$) concentration of 30.5 mass %, a viscosity of 2.0 mPa·s, and a DLS average secondary particle diameter of 16 nm. Here, the P—O—Ti "bond was present" according to $^{31}$P-NMR, the residual color rate was 54%, the mass ratio of (metal oxide other than titanium oxide)/(titanium dioxide) was 0.26, the particle refractive index was 2.25, and the dispersion stability was "○".

Example 9: Cured Film Evaluation-A1

In 100 g of methanol-dispersed sol containing titanium dioxide-tin dioxide composite oxide colloidal particles (C1) modified with silicon dioxide-tin dioxide composite oxide of which surface was modified with polyoxyethylene alkyl ether phosphate (trade name: RS-710, manufactured by TOHO Chemical Industry Co., Ltd.) as obtained in Example 1, the dispersing medium was replaced with propylene glycol monomethyl ether (hereinafter, PGME) by using a rotary evaporator again to produce a PGME-dispersed sol.

At this time, the PGME-dispersed sol had a pH of 4.7, a total metal oxide ($TiO_2$, $SnO_2$, and $SiO_2$) concentration of 20.5 mass %, a viscosity of 4.5 mPa·s, and a DLS average secondary particle diameter of 12 nm. Here, the P—O—Ti "bond was present" according to $^{31}$P-NMR, the residual color rate was 54%, the mass ratio of (metal oxide other than titanium oxide)/(titanium dioxide) was 0.26, the particle refractive index was 2.25, and the dispersion stability was "○".

The sol was then used to produce a cured film by the following procedure.

To a brown bottle equipped with a magnetic stirrer were added 2.0 g of a mixture of dipentaerythritol hexa- and penta-acrylate (trade name: KAYARAD DPHA, manufactured by Nippon Kayaku Co., Ltd.) as a resin binder and 4.9 g of PGME. Then, 22.9 g of the sol of Example 9 was added while stirring. Next, 0.02 g of photo-radical polymerization initiator (trade name: Irgacure OXE01, manufactured by BASF) and 0.3 g of PGME solution containing a methacryl group-based surface modifier (trade name: KP-412, manufactured by Shin-Etsu Chemical Co., Ltd.) (KP-412 concentration: 10.0 mass %) were added and stirred for 0.5 hours to prepare a coating liquid. A glass substrate was provided and coated with the coating liquid (at a film thickness of 1 μm) by spin-coating at room temperature (25° C.) and humidity (50%). After the solvent was volatilized at 100° C. for 1 minute, the material was UV-cured using a high-pressure mercury lamp at an integrated light intensity of 1000 mJ/cm$^2$ to form a cured film.

The obtained cured film had a refractive index of 1.80, transparency of "○", and light resistance of "○". The imprintability was also evaluated using the same coating liquid and graded as "○".

Example 10: Cured Film Evaluation-A2

First, 1.5 g of RS-710 was further added to 100 g of methanol-dispersed sol containing titanium dioxide-tin dioxide composite oxide colloidal particles (C1) modified with silicon dioxide-tin dioxide composite oxide of which surface was modified with polyoxyethylene alkyl ether phosphate (trade name: RS-710, manufactured by TOHO Chemical Industry Co., Ltd.) as obtained in Example 1. The dispersing medium was replaced with propylene glycol monomethyl ether acetate (hereinafter, PGMEA) by using a rotary evaporator again to produce a PGMEA-dispersed sol. At this time, the PGMEA-dispersed sol had a pH of 4.1, a total metal oxide ($TiO_2$, $SnO_2$, and $SiO_2$) concentration of 20.5 mass %, a viscosity of 5.5 mPa·s, and a DLS average secondary particle diameter of 20 nm. Here, the P—O—Ti "bond was present" according to $^{31}$P-NMR, the residual color rate was 54%, the mass ratio of (metal oxide other than titanium oxide)/(titanium dioxide) was 0.26, the particle refractive index was 2.20, and the dispersion stability was "○".

Next, a cured film was prepared. The cured film was prepared in the same manner as in Example 9: Cured film evaluation-A1, except that the sol in Example 9: Cured film evaluation-A1 was changed to the sol of Example 10.

The obtained cured film had a refractive index of 1.80, transparency of "○", and light resistance of "○". The imprintability was also evaluated using the same coating liquid and graded as "○".

Example 11: Cured Film Evaluation-A3

In the preparation of the cured film in Example 9: Cured film evaluation-A1, the same procedure as in Example 9: Cured film evaluation-A1 was repeated in the preparation, except that the resin binder was changed to urethane acrylate UA4200 (trade name) (SHIN-NAKAMURA CHEMICAL CO, LTD.).

The obtained cured film had a refractive index of 1.80, transparency of "○", and light resistance of "○". The imprintability was also evaluated using the same coating liquid and graded as "○".

Example 12: Cured Film Evaluation-A4

In the preparation of the cured film in Example 9: Cured film evaluation-A1, the same procedure as in Example 9: Cured film evaluation-A1 was repeated in the preparation, except that the resin binder was changed to ARONIX MT-3010 (trade name) (manufactured by TOAGOSEI CO., LTD.).

The obtained cured film had a refractive index of 1.80, transparency of "○", and light resistance of "○". The imprintability was also evaluated using the same coating liquid and graded as "○".

Example 13: Cured Film Evaluation-A5

A sol was prepared in the same manner as in Example 3, except that the surface modifier in Example 3 was changed to 2.5 g of 3-methacryloxypropyl trimethoxysilane (trade name: KBM-503, manufactured by Shin-Etsu Chemical Co., Ltd.). At this time, the methanol-dispersed sol had a pH of 5.7, a total metal oxide ($TiO_2$, $ZrO_2$, $SnO_2$, and $SiO_2$) concentration of 30.5 mass %, a viscosity of 1.8 mPa·s, and a DLS average secondary particle diameter of 16 nm. Here, the P—O—Ti "bond was present" according to $^{31}$P-NMR, the residual color rate was 88%, the mass ratio of (metal oxide other than titanium oxide)/(titanium dioxide) was 0.85, the particle refractive index was 2.00, and the dispersion stability was "○".

The sol was then used to produce a cured film by the following procedure.

To a glass vessel equipped with a magnetic stirrer was added 25.8 g of γ-glycidoxypropyltrimethoxysilane, and 6.2 g of 0.01 N hydrochloric acid was added dropwise while stirring. After the end of the dripping, the mixture was stirred for 0.5 hours to give partially hydrolyzed γ-glycidoxypropyltrimethoxysilane. Next, 22.5 g of propylene glycol monomethyl ether, 7.0 g of methanol, 85.6 g of the methanol-dispersed sol of Example 13, and 2.2 g of aluminum acetylacetonate as a curing agent were added to 32.0 g of the above partially hydrolyzed γ-glycidoxypropyltrimethoxysilane. The mixture was stirred for 2 hours to produce a coating liquid for hard coating. A urethane-based plastic lens (refractive index: nD=1.67) and a glass substrate were provided. The coating liquid for hard coating was applied (at a thickness of 3 μm) onto them by dip-coating. The solvent was volatilized at 80° C. for 10 minutes, followed by heat treatment at 120° C. for 2 hours. In this way, the coating film was cured.

The obtained cured film had a refractive index of 1.67, transparency of "○", light resistance of "○", and scratch resistance of "○".

Example 14: Cured Film Evaluation-A6

A sol was prepared in the same manner as in Example 3, except that the surface modifier in Example 3 was changed to 3.7 g of a silane coupling agent with an allyl isocyanurate skeleton (trade name: X-12-1290, manufactured by Shin- Etsu Chemical Co., Ltd.). At this time, the methanol-dispersed sol had a pH of 5.7, a total metal oxide ($TiO_2$, $ZrO_2$, $SnO_2$, and $SiO_2$) concentration of 30.5 mass %, a viscosity of 1.9 mPa·s, and a DLS average secondary particle diameter of 18 nm. Here, the P—O—Ti "bond was present" according to $^{31}$P-NMR, the residual color rate was 88%, the mass ratio of (metal oxide other than titanium oxide)/(titanium dioxide) was 0.85, the particle refractive index was 2.00, and the dispersion stability was "(".

Next, a cured film was prepared. The cured film was prepared in the same manner as in Example 13: Cured film evaluation-A5, except that the sol in Example 13: Cured film evaluation-A5 was changed to the sol of Example 14.

The obtained cured film had a refractive index of 1.67, transparency of "○", light resistance of "○", and scratch resistance of "○".

Example 15: Cured Film Evaluation-A7

In 100 g of methanol-dispersed sol containing titanium dioxide-tin dioxide composite oxide colloidal particles (C3) modified with silicon dioxide-tin dioxide composite oxide of which surface was modified with 3-methacryloxypropyltrimethoxysilane (trade name: KBM-503, manufactured by Shin-Etsu Chemical Co., Ltd.) used in Example 13, the dispersing medium was replaced with methyl ethyl ketone (hereinafter, MEK) by using a rotary evaporator again to produce an MEK-dispersed sol. The resulting MEK-dispersed sol had a pH of 6.0, a total metal oxide ($TiO_2$, $ZrO_2$, $SnO_2$, and $SiO_2$) concentration of 30.5 mass %, a viscosity of 2.1 mPa·s, and a DLS average secondary particle diameter of 17 nm. Here, the P—O—Ti "bond was present" according to $^{31}$P-NMR, the residual color rate was 88%, the mass ratio of (metal oxide other than titanium oxide)/(titanium dioxide) was 0.85, the particle refractive index was 2.00, and the dispersion stability was "○".

The sol was then used to produce a cured film by the following procedure.

To a brown bottle equipped with a magnetic stirrer were added 17.6 g of a mixture of dipentaerythritol hexa- and penta-acrylate (trade name: KAYARAD DPHA, manufactured by Nippon Kayaku Co., Ltd.) as a resin binder, 5.2 g of methanol, and 18.3 g of PGME. Then, 57.2 g of the sol of Example 15 was added while stirring. Next, 0.9 g of photo-radical polymerization initiator (trade name: Irgacure OXE01, manufactured by BASF) and 0.9 g of PGME solution containing polyether-modified silicone oil (trade name: L-7001, manufactured by Dow Corning Toray) (the L-7001 concentration: 2.0 mass %) were added and stirred for 0.5 hours to prepare a coating liquid. A glass substrate was provided and coated with the coating liquid (at a film thickness of 3 μm) by spin-coating. After the solvent was volatilized at 80° C. for 2 minutes, the material was UV-cured using a high-pressure mercury lamp at an integrated light intensity of 1000 mJ/cm$^2$ to form a cured film.

The obtained cured film had a refractive index of 1.67, transparency of "○", light resistance of "○", and scratch resistance of "○".

Example 16: Cured Film Evaluation-A8

In 100 g of methanol-dispersed sol containing titanium dioxide-tin dioxide composite oxide colloidal particles (C1) modified with silicon dioxide-tin dioxide composite oxide of which surface was modified with a silane coupling agent with an allyl isocyanurate skeleton (X-12-1290, manufactured by Shin-Etsu Chemical Co., Ltd.) as used in Example 14, the dispersing medium was replaced with MEK by using a rotary evaporator again to produce an MEK-dispersed sol. The resulting MEK-dispersed sol had a pH of 5.9, a total metal oxide ($TiO_2$, $ZrO_2$, $SnO_2$, and $SiO_2$) concentration of 30.5 mass %, a viscosity of 1.7 mPa·s, and a DLS average secondary particle diameter of 15 nm. Here, the P—O—Ti "bond was present" according to $^{31}$P-NMR, the residual color rate was 88%, the mass ratio of (metal oxide other than titanium oxide)/(titanium dioxide) was 0.85, the particle refractive index was 2.00, and the dispersion stability was "○".

Next, a cured film was prepared. The cured film was prepared in the same manner as in Example 15: Cured film evaluation-A7, except that the sol in Example 15: Cured film evaluation-A7 was changed to the sol of Example 16.

The obtained cured film had a refractive index of 1.67, transparency of "○", light resistance of "○", and scratch resistance of "○".

Comparative Example 1: Cured Film Evaluation-B1

In 100 g of water-dispersed sol containing titanium dioxide-tin dioxide composite oxide colloidal particles (C8) with the core surface modified with polyoxyethylene alkyl ether phosphate as obtained in Production Example 8, the dispersing medium was replaced with methanol by using a rotary evaporator to produce a methanol-dispersed sol containing titanium dioxide-tin dioxide composite oxide colloidal particles (C8) with the core surface modified with polyoxyethylene alkyl ether phosphate. This methanol-dispersed sol had a pH of 3.5, a total metal oxide ($TiO_2$ and $SnO_2$) concentration of 20.5 mass %, a viscosity of 2.3 mPa-s, and a DLS average secondary particle diameter of 32 nm. Here, the P—O—Ti "bond was present" according to $^{31}$P-NMR, the residual color rate was 0%, the mass ratio of (metal oxide other than titanium oxide)/(titanium dioxide) was 0.10, the particle refractive index was 2.10, and the dispersion stability was "x".

FIG. 2 is a $^{31}$P-NMR spectrum of the titanium dioxide-tin dioxide composite oxide colloidal particles (A1) as obtained in Production Example 8 used in Comparative Example 1. There is no shell layer covering the core, and the aqueous phosphoric acid solution is in direct contact with the core. A peak around δ=3 to 5 ppm was observed, which peak is derived from the (Ti—O—P) bond, via an oxygen atom, between the Ti atom on the core and the P atom in the phosphoric acid. Thus, the (Ti—O—P) "bond was present". That is, the (Ti—O—P) bond was present in the metal oxide particles of the core alone.

Next, a cured film was prepared. A cured film was prepared in the same manner as in Example 13 Cured film evaluation-A5, except that the weight of the metal oxide in Comparison Example 1 was changed in Example 13: Cured film evaluation-A5 so that the weight of the metal oxide was the same as in Example 13 Cured film evaluation-A5.

The obtained cured film had a refractive index of 1.70, transparency of "○", light resistance of "x", which was insufficient, and scratch resistance of "○" in the evaluations.

Comparative Example 2: Cured Film Evaluation-B2

In 100 g of water-dispersed sol containing titanium dioxide-tin dioxide composite oxide colloidal particles (C9) modified with silicon dioxide-tin dioxide composite oxide as obtained in Production Example 9, the dispersing medium was replaced with methanol by using a rotary evaporator.

The solvent was then replaced again with PGME to give a PGME-dispersed sol. At this time, the PGME-dispersed sol had a pH of 4.7, a total metal oxide ($TiO_2$, $SnO_2$, and $SiO_2$) concentration of 20.5 mass %, a viscosity of 4.5 mPa·s, and a DLS average secondary particle diameter of 21 nm. Here, the P—O—Ti "bond was absent" by $^{31}$P-NMR, the residual color rate was 98%, the mass ratio of (metal oxide other than titanium oxide)/(titanium dioxide) was 1.38, the particle refractive index was 1.78, and the dispersion stability was "○".

The sol was then used to produce a cured film by the following procedure.

To a brown bottle equipped with a magnetic stirrer were added 1.3 g of a mixture of dipentaerythritol hexa- and penta-acrylate (trade name: KAYARAD DPHA, manufactured by Nippon Kayaku Co., Ltd.) as a resin binder and 3.0 g of PGME. Then, 25.3 g of the sol of Comparative Example 2 was added while stirring. Next, 0.01 g of photo-radical polymerization initiator (trade name: Irgacure OXE01, manufactured by BASF) and 0.3 g of PGME solution containing a methacryl group-based surface modifier (trade name: KP-412, manufactured by Shin-Etsu Chemical Co., Ltd.) (KP-412 concentration: 10.0 mass %) were added and stirred for 0.5 hours to prepare a coating liquid. A glass substrate was provided and coated with the coating liquid (at a film thickness of 1 μm) by spin-coating. After the solvent was volatilized at 100° C. for 1 minute, the material was UV-cured using a high-pressure mercury lamp at an integrated light intensity of 1000 $mJ/cm^2$ to form a cured film.

The obtained cured film had a refractive index of 1.65, transparency of "○", and light resistance of "○". In addition, the imprintability was also evaluated using the same coating liquid and graded as "x".

Comparative Example 3: Cured Film Evaluation-B3

A sol was prepared in the same manner as in Example 13: Cured film evaluation-A5, except that the sol in Example 13: Cured film evaluation-A5 was changed to titanium dioxide-tin dioxide-zirconium oxide composite oxide colloidal particles (C10) modified with silicon dioxide-tin dioxide composite oxide as obtained in Production Example 10. At this time, the methanol-dispersed sol had a pH of 5.7, a total metal oxide ($TiO_2$, $ZrO_2$, $SnO_2$, and $SiO_2$) concentration of 30.5 mass %, a viscosity of 1.6 mPa·s, and a DLS average secondary particle diameter of 22 nm. Here, the P—O—Ti "bond was absent" by $^{31}$P-NMR, the residual color rate was 98%, the mass ratio of (metal oxide other than titanium oxide)/(titanium dioxide) was 1.85, the particle refractive index was 1.70 and insufficient, and the dispersion stability was "○".

FIG. 3 is a $^{31}$P-NMR spectrum of the titanium dioxide-tin dioxide-zirconium oxide composite oxide colloidal particles (C10) modified with silicon dioxide-tin dioxide composite oxide as obtained in Production Example 10 used in Comparative Example 3. Used was the titanium dioxide-tin dioxide-zirconium oxide composite oxide colloidal particles (C10) modified with silicon dioxide-tin dioxide composite oxide as obtained in Production Example 10. The shell layer covering the core was fully coated, and no part of the core was exposed. When the core-shell type modified metal oxide particles were in contact with an aqueous phosphoric acid solution, a peak around δ=3 to 5 ppm was unobserved, which peak is derived from the (Ti—O—P) bond, via an oxygen atom, between the Ti atom on the core and the P atom in the phosphoric acid. Thus, the (Ti—O—P) "bond was absent". That is, in the core-shell type metal oxide particles, there was no part where the shell layer covering the core was missing and where the areas of the core were exposed. The core was thus entirely covered by the shell layer.

Next, a cured film was prepared. The cured film was prepared in the same manner as in Example 13: Cured film evaluation-A5, except that the sol in Example 13: Cured film evaluation-A5 was changed to the sol of Comparative Example 3.

The obtained cured film had a refractive index of 1.56, transparency of "○", light resistance of "○", and scratch resistance of "○".

Comparative Example 4: Cured Film Evaluation-B4

In 100 g of methanol-dispersed sol containing titanium dioxide-tin dioxide composite oxide colloidal particles (C10) modified with silicon dioxide-tin dioxide composite oxide of which surface was modified with 3-methacryloxypropyltrimethoxysilane (trade name: KBM-503, manufactured by Shin-Etsu Chemical Co., Ltd.) in Comparative Example 3: Cured film evaluation-B3, the dispersing medium was replaced with MEK by using a rotary evaporator again to produce an MEK-dispersed sol. The resulting MEK-dispersed sol had a pH of 6.2, a total metal oxide ($TiO_2$, $ZrO_2$, $SnO_2$, and $SiO_2$) concentration of 30.5 mass %, a viscosity of 2.0 mPa·s, and a DLS average secondary particle diameter of 25 nm. Here, the P—O—Ti "bond was absent" by $^{31}$P-NMR, the residual color rate was 98%, the mass ratio of (metal oxide other than titanium oxide)/(titanium dioxide) was 1.85, the particle refractive index was 1.70 and insufficient, and the dispersion stability was "○".

Next, a cured film was prepared. The cured film was prepared in the same manner as in Example 15: Cured film evaluation-A7, except that the sol in Example 15: Cured film evaluation-A7 was changed to the sol of Comparative Example 4.

The obtained cured film had a refractive index of 1.56, transparency of "○", light resistance of "○", and scratch resistance of "○".

Industrial Applicability

The present invention provides: a modified metal oxide particle, namely a core-shell type metal oxide particle used in a composition for obtaining a coating material with a high refractive index and high moldability (e.g., for nanoimprinting), the modified metal oxide particle comprising a titanium dioxide-containing metal oxide particle as a core and metal oxide particles other than titanium oxide as a shell that covers the core where a part of the core is exposed; and a method for producing the modified metal oxide particle.

The invention claimed is:

1. A core-shell type metal oxide particle comprising: a core comprising a metal oxide particle having an average primary particle diameter of 3 to 100 nm; and a shell comprising metal oxide particles having an average primary particle diameter of 1 to 7 nm and covering a surface of the core, wherein the metal oxide particle in the core has an average primary particle diameter greater than the average primary particle diameter of the metal oxide particles of the shell, wherein when a component (a) is titanium dioxide and a component (b) is a metal oxide other than titanium oxide, the core comprises a particle comprising the component (a) or a combination of the components (a) and (b), and the shell comprises a particle comprising the component (b), wherein the shell does not completely cover the core, leaving the core exposed, and the following requirements A and B are satisfied:

the requirement A: in a test of bringing the core-shell type metal oxide particle into contact with a compound having a P—OH bond, the core-shell type metal oxide particle is found, by NMR, to have a P—O—Ti bond formed, and the requirement B: the core-shell type metal oxide particle has a refractive index of 1.85 or more.

2. The core-shell type metal oxide particle according to claim 1, wherein the respective component (b) is a particle of at least one metal oxide selected from the group consisting of zirconium oxide, silicon dioxide, aluminum oxide, tin oxide, zinc oxide, iron oxide, niobium oxide, tantalum oxide, antimony oxide, and tungsten oxide.

3. The core-shell type metal oxide particle according to claim 1, wherein a mass ratio of (metal oxide other than titanium oxide)/(titanium dioxide) ranges from 0.05 to 1.0.

4. The core-shell type metal oxide particle according to claim 1, wherein an intermediate layer is present between the core particle and the shell particles, and the intermediate layer comprises, as a component (D), a metal oxide particle comprising a combination of at least one selected from the group consisting of zirconium oxide, silicon dioxide, aluminum oxide, tin oxide, zinc oxide, iron oxide, niobium oxide, tantalum oxide, antimony oxide, and tungsten oxide, and wherein a mass ratio of (metal oxide other than titanium oxide)/(titanium dioxide) ranges from 0.05 to 1.0.

5. The core-shell type metal oxide particle according to claim 1, wherein the core-shell type metal oxide particle has a surface coated with a compound having a P—OH bond or an Si—OH bond.

6. The core-shell type metal oxide particle according to claim 1, wherein the compound having an Si—OH bond is at least one silane compound or a hydrolysate thereof, the at least one silane compound being selected from the group consisting of formulas (1) to (3):

$R^1_aSi(R^2)_{4-a}$ Formula (1)

$[R^3_bSi(R^4)_{3-b}]_2Y_c$ Formula (2)

$R^5_dSi(R^6)_{4-d}$ Formula (3)

wherein in formula (1), $R^1$ moieties are each an alkyl group, a halogenated alkyl group, an alkenyl group, an aryl group, or an organic group having a polyether group, an epoxy group, a (meth)acryloyl group, a mercapto group, an amino group, a ureido group, or a cyano group, and bonded to a silicon atom via an Si—C bond, $R^2$ moieties each represent an alkoxy group, an acyloxy group, or a halogen group, and a represents an integer from 1 to 3; and in formulas (2) and (3), $R^3$ and $R^5$ moieties are each a $C_{1-3}$ alkyl group or a $C_{6-30}$ aryl group, and bonded to a silicon atom via an Si—C bond, $R^4$ and $R^6$ moieties are each an alkoxy group, an acyloxy group, or a halogen group, Y is an alkylene group, an NH group, or an oxygen atom, b is an integer from 1 to 3, c is an integer 0 or 1, and d is an integer from 1 to 3.

7. The core-shell type metal oxide particle according to claim 1, wherein the compound having a P—OH bond is at least one phosphoric acid ester selected from the group consisting of formulas (4) to (6):

Formula (4)

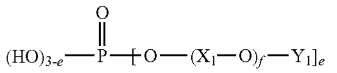

Formula (5)

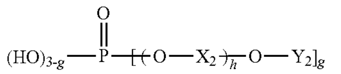

Formula (6)

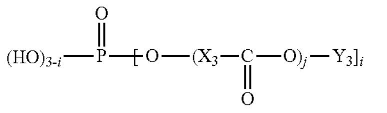

wherein $X_1$, $X_2$, and $X_3$ each represent a $C_{2-20}$ alkylene group, f, h, and j each represent an integer from 1 to 100, e, g, and i each represent an integer from 1 to 3, and $Y_1$, $Y_2$, and $Y_3$ each represent a hydrogen atom, a $C_{1-20}$ alkyl group, a $C_{2-20}$ alkenyl group, a $C_{6-30}$ aryl group, or a (meth)acrylic group.

8. The core-shell type metal oxide particle according to claim 7, wherein the phosphoric acid ester is a polyoxyethylene alkyl ($C_{6-20}$) ether phosphoric acid ester having a $C_{6-20}$ alkyl group.

9. A core-shell type metal oxide sol comprising, as a dispersing matter, the core-shell type metal oxide particle according to claim 1 as dispersed in a dispersing medium comprising an alcohol optionally having an ether bond, an ester, a ketone, an amide, a hydrocarbon, a silicone, a compound containing an unsaturated bond between chain carbon atoms, an oxirane compound, water, or any combination thereof, wherein an average particle size thereof is from 5 to 500 nm as measured by a dynamic light scattering method.

10. The core-shell type metal oxide sol according to claim 9, further comprising a surfactant, wherein the surfactant is an anionic surfactant, a cationic surfactant, a nonionic surfactant, or an amphoteric surfactant.

11. The core-shell type metal oxide sol according to claim 9, further comprising a secondary or tertiary amine having a total carbon atom number of 5 to 35.

12. A varnish comprising the core-shell type metal oxide particle according to claim 1 and a thermosetting or photocurable resin.

13. The varnish according to claim 12, wherein the varnish is a hard coating agent or a composition for nanoimprinting.

14. A method for producing the core-shell type metal oxide sol according to claim 9, the method comprising the following steps (i) and (ii):

step (i): step (i) of preparing a sol (A) comprising, as a dispersing medium, water containing a metal oxide particle having an average primary particle diameter of 3 to 60 nm as measured by a nitrogen gas adsorption method and a sol (B) comprising, as a dispersing medium, water containing a metal oxide particle having an average primary particle diameter of 1 to 7 nm as measured by a nitrogen gas adsorption method; and step (ii): step (ii) of mixing the sol (A) and the sol (B) such that a solid content of one of the sols is admixed in a container at a rate of 22 to 1000 parts by mass per minute based on 100 parts by mass of a solid content of the other sol packed in the container.

15. The method for producing a core-shell type metal oxide sol according to claim 14, wherein step (i) or (ii) further comprising step (S-1): a step of adding, to the aqueous sol, a secondary or tertiary amine having a total carbon atom number of 5 to 35.

16. The core-shell type metal oxide particle according to claim 1, wherein the refractive index is from 1.85 to 2.30.

* * * * *